(12) United States Patent
Kitamura

(10) Patent No.: US 6,895,017 B2
(45) Date of Patent: May 17, 2005

(54) MEDIA CONVERT SERVICE PROVIDING METHOD

(75) Inventor: Takuya Kitamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 965 days.

(21) Appl. No.: 09/784,609

(22) Filed: Feb. 15, 2001

(65) Prior Publication Data

US 2005/0030973 A1 Feb. 10, 2005

(30) Foreign Application Priority Data

Aug. 29, 2000 (JP) ...................................... 2000-259834

(51) Int. Cl.⁷ ............................................ H04L 12/66
(52) U.S. Cl. ..................................................... 370/466
(58) Field of Search ................................ 370/465, 466, 370/467

(56) References Cited

U.S. PATENT DOCUMENTS

| | | | |
|---|---|---|---|
| 6,263,064 B1 * | 7/2001 | O'Neal et al. | 379/201.03 |
| 6,421,707 B1 * | 7/2002 | Miller et al. | 709/206 |
| 6,618,763 B1 * | 9/2003 | Steinberg | 709/246 |
| 2001/0023400 A1 * | 9/2001 | Kurganov et al. | 704/270.1 |

FOREIGN PATENT DOCUMENTS

| | | |
|---|---|---|
| JP | 05030135 | 2/1993 |
| JP | 05037555 | 2/1993 |

* cited by examiner

*Primary Examiner*—Melvin Marcelo
(74) *Attorney, Agent, or Firm*—Katten Muchin Zavis Rosenman

(57) ABSTRACT

A media convert service providing method is capable of registering specified pieces of information according to receiving media convert categories and receiving terminal categories in an information communication processing system on a communication network by utilizing a free usable field or a blank field in a frame based on a specified communication protocol. This makes it feasible to configure a system by extending a conventional media convert type information communication system and to provide terminal users (senders and receivers) with media convert services with a much higher usability.

15 Claims, 32 Drawing Sheets

| INFORMATION RECEIVED BY INFORMATION COMMUNICATION PROCESSING SYSTEM | CONVERSIONS BY INFORMATION COMMUNICATION PROCESSING SYSTEM | TRANSMISSION TARGET TERMINALS FOR INFORMATION COMMUNICATION PROCESSING SYSTEM | TRANSMISSION COMMUNICATION MODE OF INFORMATION COMMUNICATION PROCESSING SYSTEM |
|---|---|---|---|
| TELEPHONE (INCLUDING MOBILE COMMUNICATIONS) | VOICE ↕ | ANALOG TELEPHONE | TELEPHONE |
| | | MOBILE TERMINAL | TELEPHONE, UUI MAIL, INDEPDENT SYSTEM MAIL OF xx COMPANY |
| IP TELEPHONE | VOICE DATA | ISDN TELEPHONE | TELEPHONE, UUI MAIL |
| | | ISDN ORIENDTED TA/SOHO ROUTER + PC | IP TELEPHONE, E-MAIL, UUI MAIL, MESSAGE |
| E-MAIL | VOICE DATA ↕ | PC DIRECTLY CONNECTED TO ANALOG TELEPHONE LINE | IP TELEPHONE, E-MAIL, MESSAGE |
| UUI MAIL | | DSU/SOHO ROUTER+PC/GAME MACHINE FOR ACCESS LINES OTHER THAN ANALOG TELEPHONE/ISDN (FWA, WIRELESS LAN, xDSL, CATV) | IP TELEPHONE, E-MAIL, MESSAGE |
| INDEPENDENT SYSTEM MAIL | TEXT | | |
| MESSAGE | FAX DATA ↕ | FAX | FAX |
| FAX | TEXT | | |

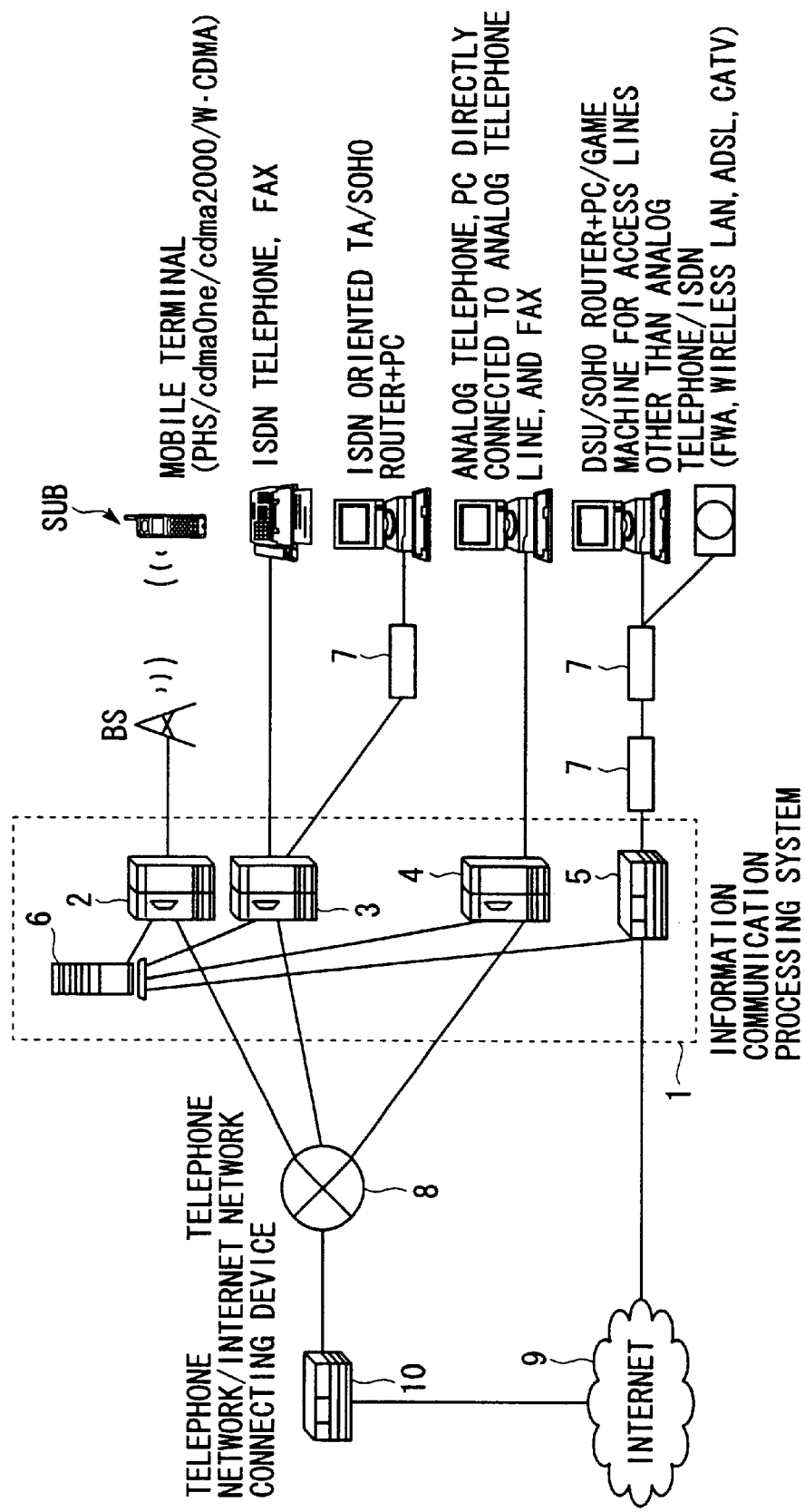

FIG. 2

| INFORMATION RECEIVED BY INFORMATION COMMUNICATION PROCESSING SYSTEM | CONVERSIONS BY INFORMATION COMMUNICATION PROCESSING SYSTEM | TRANSMISSION TARGET TERMINALS FOR INFORMATION COMMUNICATION PROCESSING SYSTEM | TRANSMISSION COMMUNICATION MODE OF INFORMATION COMMUNICATION PROCESSING SYSTEM |
|---|---|---|---|
| TELEPHONE (INCLUDING MOBILE COMMUNICATIONS) | VOICE ↔ VOICE DATA | ANALOG TELEPHONE | TELEPHONE |
| | | MOBILE TERMINAL | TELEPHONE, UUI MAIL, INDEPDENT SYSTEM MAIL OF xx COMPANY |
| | | ISDN TELEPHONE | TELEPHONE, UUI MAIL |
| IP TELEPHONE | VOICE DATA ↔ VOICE DATA | ISDN ORIENDTED TA/SOHO ROUTER + PC | IP TELEPHONE, E-MAIL, UUI MAIL, MESSAGE |
| E-MAIL | VOICE DATA ↔ TEXT | PC DIRECTLY CONNECTED TO ANALOG TELEPHONE LINE | IP TELEPHONE, E-MAIL, MESSAGE |
| UUI MAIL | | DSU/SOHO ROUTER+PC/GAME MACHINE FOR ACCESS LINES OTHER THAN ANALOG TELEPHONE/ISDN (FWA, WIRELESS LAN, xDSL, CATV) | IP TELEPHONE, E-MAIL, MESSAGE |
| INDEPENDENT SYSTEM MAIL | | | |
| MESSAGE | FAX DATA ↔ TEXT | FAX | FAX |
| FAX | | | |

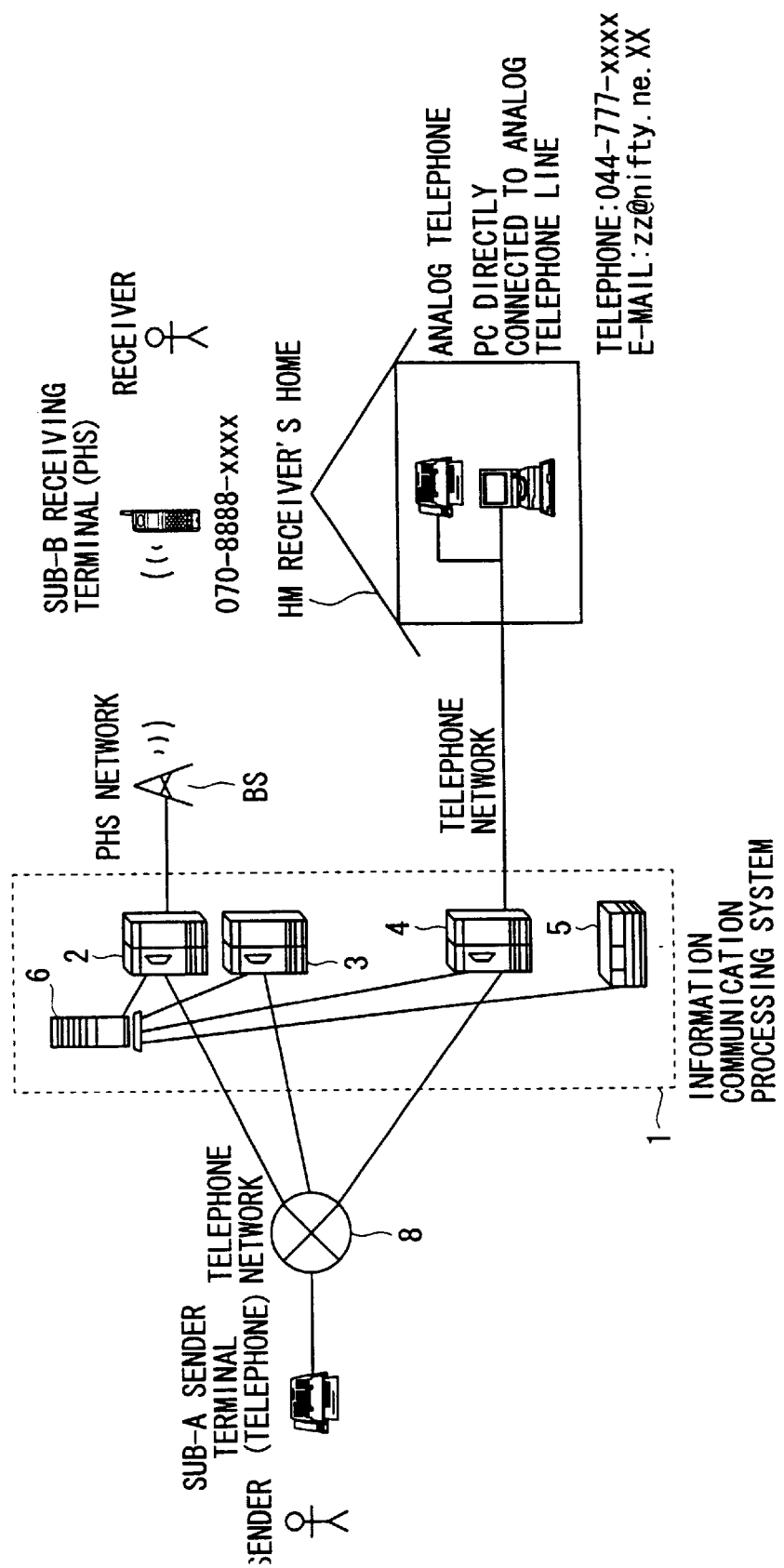

INITIAL SETTING (COPYING OF TABLE OF INFORMATION COMMUNICATION PROCESSING SYSTEM)

INITIAL SETTING (ADDING OF UUI MAIL)

CHANGE OF RECEIVING MODE

UPDATING OF TABLE OF INFORMATION COMMUNICATION PROCESSING SYSTEM

FIG. 5A

TBL1 TERMINAL RETAINING TABLE (INITIAL STATUS)

| USER NAME | Fujitsu_taro | | | |
|---|---|---|---|---|
| PASSWORD | Fujitsu | | | |
| LATEST UPDATED DATE | 99991231235959 | | | |
| MEDIA | NORMAL PROCESS | | SPECIFYING PROCESS | |
| | PROCESS | DESTINATION | TARGET TERMINAL | DESTINATION |

FIG. 5B

TBL1 TERMINAL RETAINING TABLE (AFTER COPYING TABLE OF INFORMATION COMMUNICATION PROCESSING SYSTEM)

| USER NAME | Fujitsu_taro | | | |
|---|---|---|---|---|
| PASSWORD | Fujitsu | | | |
| LATEST UPDATED DATE | 20000228144530 | | | |
| MEDIA | NORMAL PROCESS | | SPECIFYING PROCESS | |
| | PROCESS | DESTINATION | TARGET TERMINAL | DESTINATION |
| TELEPHONE | E-MAIL | zz@nifty.ne.xx | | |
| IP TELEPHONE | E-MAIL | zz@nifty.ne.xx | | |
| E-MAIL | NO CONVERSION | | | |
| MESSAGE | E-MAIL | zz@nifty.ne.xx | | |

FIG. 5C

TBL1 TERMINAL RETAINING TABLE (AFTER SETTING)

| USER NAME | Fujitsu_taro | | | | |
|---|---|---|---|---|---|
| PASSWORD | Fujitsu | | | | |
| LATEST UPDATED DATE | 20000228150445 | | | | |
| MEDIA | NORMAL PROCESS | | SPECIFYING PROCESS | | |
| | PROCESS | DESTINATION | TARGET TERMINAL | PROCESS | DESTINATION |
| TELEPHONE | UUI MAIL | 070-8888-xxxx | | | |
| IP TELEPHONE | UUI MAIL | 070-8888-xxxx | | | |
| E-MAIL | UUI MAIL | 070-8888-xxxx | | | |
| UUI MAIL | NO CONVERSION | | | | |
| MESSAGE | UUI MAIL | 070-8888-xxxx | | | |

FIG. 9

UUI FRAME STRUCTURE

| 8 | 7 | 6 | 5 | 4 | 3 | 2 | 1 |
|---|---|---|---|---|---|---|---|
| \multicolumn{4}{l}{0000 (PREPARATORY)} | | | | 0001 (APPLICATION IDENTIFIER) | | | |
| 00001000 (APPLICATION IDENTIFIER: NOTIFYING OF RECEIPT OF E-MAIL *1) |||||||||
| 10000001 (INDICATION OF UNCOMPATIBILITY: DISCONNECT) |||||||||
| 01111110 (APPLICATION GENERAL-PURPOSE DATA) |||||||||
| * (LENGTH OF CONTENT OF APPLICATION GENERAL-PURPOSE DATA) |||||||||
| * (REQUEST FOR CONFIRMING TRANSMISSION) |||||||||
| 1 | 000 (DIVIDED IDENTIFIER) | | | B | E | 00 (PREPARATORY) | |
| * (SEQUENCE NUMBER) |||||||||
| INFORMATION MODULE (FIG. 10) |||||||||

*1 GIVEN BY UCG

TRANSMISSION CONFIRMATION REQUEST: 00000000···TRANSMISSION CONFIRMATION UNNECESSARY, 00000001···TRANSMISSION CONFIRMATION NECESSARY, OTHERS···RESERVATION

OMISSION POSSIBLE: NO DIVISION WHEN OMITTED
B E
0 0 INTERMEDIATE DATA
0 1 LAST DATA
1 0 FIRST DATA
1 1 USE INHIBITED

INCREMENT SEQUENCE NUMBER BY 1
00000000 NEXT TO 11111111

IF INFORMATION CAN NOT BE ALL TRANSMITTED THROUGH ONE COMMUNICATION WITH DIVISION IDENTIFIER AND SEQUENCE NUMBER, DIVISION/RESTORATION CAN BE EFFECTED

UUI FRAME STRUCTURE (UUI MAIL)

UUI FRAME STRUCTURE (STOP OF URGENT COMMUNICATION)

UUI FRAME STRUCTURE (INDICATION OF POWER-ON)

FIG. 12A

TBL2 INFORMATION COMMUNICATION PROCESSING SYSTEM RETAINING TABLE (BEFORE UPDATED)

| USER NAME | Fujitsu taro | | | | |
|---|---|---|---|---|---|
| PASSWORD | Fujitsu | | | | |
| LATEST UPDATED DATE | 20000228144530 | | | | |
| MEDIA | NORMAL PROCESS | | SPECIFYING PROCESS | | |
| | PROCESS | DESTINATION | TARGET TERMINAL | PROCESS | DESTINATION |
| TELEPHONE (NUMBER) | E-MAIL | zz@nifty.ne.xx | | | |
| IP TELEPHONE (IP ADDRESS, TELEPHONE NUMBER) | E-MAIL | zz@nifty.ne.xx | | | |
| E-MAIL (MAIL ADDRESS) | NO CONVERSION | | | | |
| MESSAGE (IP ADDRESS, TELEPHONE NUMBER) | E-MAIL | zz@nifty.ne.xx | | | |

FIG. 12B

TBL2 INFORMATION COMMUNICATION PROCESSING SYSTEM RETAINING TABLE (AFTER UPDATED)

| USER NAME | Fujitsu taro | | | | |
|---|---|---|---|---|---|
| PASSWORD | Fujitsu | | | | |
| LATEST UPDATED DATE | 20000228150445 | | | | |
| MEDIA | NORMAL PROCESS | | SPECIFYING PROCESS | | |
| | PROCESS | DESTINATION | TARGET TERMINAL | PROCESS | DESTINATION |
| TELEPHONE (NUMBER) | UUI MAIL | 070-8888-xxxx | | | |
| IP TELEPHONE (IP ADDRESS) | UUI MAIL | 070-8888-xxxx | | | |
| E-MAIL (MAIL ADDRESS) | UUI MAIL | 070-8888-xxxx | | | |
| UUI MAIL (NUMBER) | NO CONVERSION | | | | |
| MESSAGE (IP ADDRESS) | UUI MAIL | 070-8888-xxxx | | | |

FIG. 15A

| MEDIA OF SENDER | MEDIA OF RECEIVER | | |
|---|---|---|---|
| | TELEPHONE | IP TELEPHONE | E-MAIL |
| TELEPHONE | — | ·START UP IP TELEPHONE APPLICATON. AND CONFIRM THAT CONNECTION CAN BE ESTABLISHED<br>·CONVERT VOICES SEQUENTIALLY INTO IP FORMAT AND TRANSMIT IT | ·NOTIFY SENDER OF INPUT OF VOICE MESSAGE<br>·RECORD VOICES<br>·CONVERT VOICE DATA INTO TEXT FORMAT<br>·DELIVER MAIL |
| IP TELEPHONE | ·GIVE CALL TO RECEIVING TERMINAL<br>·RESTORE IP PAKCET INTO VOICE DATA SEQUENTIALLY WHEN RESPONSE COMES IN, AND READ OUT VOICE DATA | — | SAME AS ABOVE |
| E-MAIL | ·GIVE CALL TO RECEIVING TERMINAL<br>·EXTRACT TEXT DATA<br>·READ OUT TEXT DATA SEQUENTIALLY WHEN RESPONSE COMES IN | ·START UP IP TELEPHONE APPLICATION AND CONFIRM THAT CONNECTION CAN BE ESTABLISHED<br>·EXTRACT TEXT DATA<br>·READ OUT SEQUENTIALLY TEXT DATA | — |
| UUI MAIL | SAME AS ABOVE | SAME AS ABOVE | ·EXTRACT AND CONVERT TEXT DATA INTO E-MAIL FORMAT |
| INDEPENDENT SYSTEM MAIL OF xx COMPANY | SAME AS ABOVE | SAME AS ABOVE | SAME AS ABOVE |
| MESSAGE APPLICATION | SAME AS ABOVE | SAME AS ABOVE | SAME AS ABOVE |
| FAX | ·CONVERT FAX DATA INTO TEXT FORMAT BY OCR<br>·GIVE CALL TO RECEIVING TERMINAL<br>·READ OUT TEXT DATA SEQUENTIALLY WHEN RESPONSE COMES IN | ·CONVERT FAX DATA INTO TEXT FORMAT BY OCR<br>·START UP IP TELEPHONE APPLICATION AND CONFIRM THAT CONNECTION CAN BE ESTABLISHED<br>·READ OUT SEQUENTIALLY TEXT DATA | ·CONVERT FAX DATA INTO TEXT FORMAT BY OCR<br>·SET DATA IN E-MAIL FORMAT AND TRANSMIT DATA |

FIG. 15B

| | MEDIA OF RECEIVER | | | |
|---|---|---|---|---|
| | UUI MAIL | INDEPENDENT SYSTEM MAIL OF xx COMPANY | MESSAGE APPLICATION | FAX |
| A ↑ | • GIVE CALL TO RECEIVING TERMINAL<br>• CONVERT VOICES SEQUENTIALLY INTO TEXT FORMAT WHEN RESPONSE COMES IN, SET THEM IN UUI AND TRANSMIT THEM | • CONVERT VOICES INTO TEXT FORMAT AND SET TEXT IN UUI<br>• GIVE CALL TO RECEIVING TERMINAL<br>• CONVERT SEQUENTIALLY VOICES INTO TEXT WHEN RESPONSE COMES IN, SET TEXT IN MAIL FORMAT OF EACH COMPANY AND TRANSMIT MAIL | • START UP MESSAGE APPLICATION, CONFIRM THAT CONNECTION CAN BE ESTABLISHED AND CONVERT VOICES SEQUENTIALLY INTO TEXT<br>• SET IN MESSAGE APPLICATION FORMAT AND TRANSMIT MESSAGE | • NOTIFY SENDER OF INPUT OF VOICE MESSAGE<br>• RECORD VOICES<br>• CONVERT VOICE DATA INTO TEXT<br>• CONVERT TEXT DATA INTO FAX FORMAT AND TRANSMIT DATA |
| | SAME AS ABOVE | SAME AS ABOVE | SAME AS ABOVE | SAME AS ABOVE |
| | • EXTRACT AND CONVERT TEXT DATA INTO UUI MAIL FORMAT AND TRANSMIT MAIL | • EXTRACT AND CONVERT TEXT DATA INTO MAIL FORMAT OF EACH COMPANY AND TRANSMIT MAIL | • EXTRACT AND COVNERT TEXT DATA INTO MESSAGE APPLICATION FORMAT AND TRNASMIT MESSAGE | • EXTRACT AND COVNERT TEXT DATA INTO FAX FORMAT AND TRANSMIT DATA |
| | — | SAME AS ABOVE | SAME AS ABOVE | SAME AS ABOVE |
| | • EXTRACT AND CONVERT TEXT DATA INTO UUI MAIL FORMAT AND TRANSMIT MAIL | • EXTRACT AND COVNERT TEXT DATA INTO MAIL FORMAT OF EACH COMPANY AND TRANSMIT MAIL | — | SAME AS ABOVE |
| B ↑ | • CONVERT FAX DATA INTO TEXT FORMAT BY OCR<br>• SET DATA IN UUI MAIL FORMAT AND DELIVER MAIL | • CONVERT FAX DATA INTO TEXT FORMAT BY OCR<br>• SET TEXT IN MAIL FORMAT OF EACH COMPANY AND TRANSMIT MAIL | • CONVERT FAX DATA INTO TEXT FORMAT BY OCR<br>• SET IN MESSAGE APPLICATION FORMAT AND TRANSMIT MESSAGE | — |

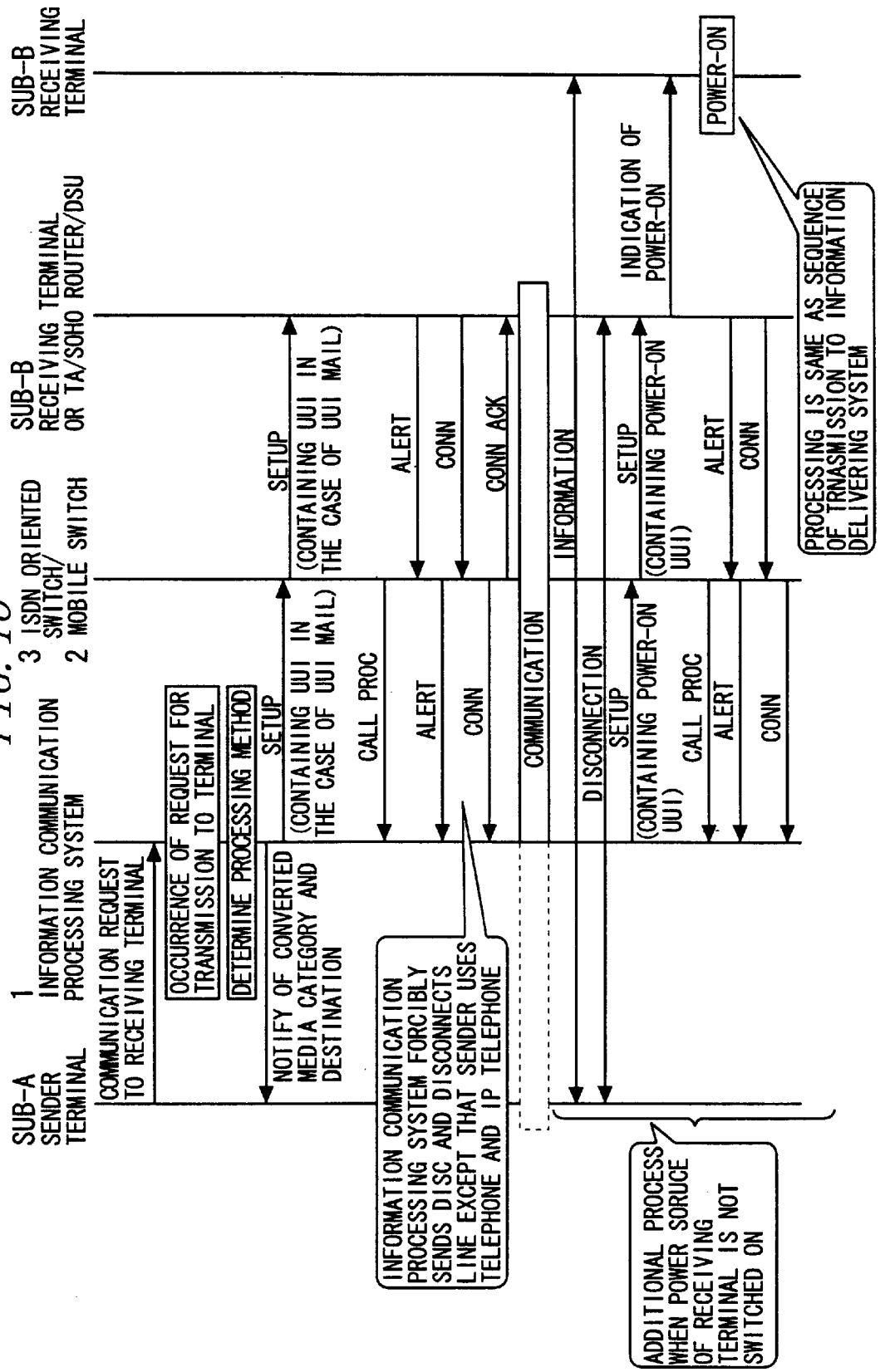

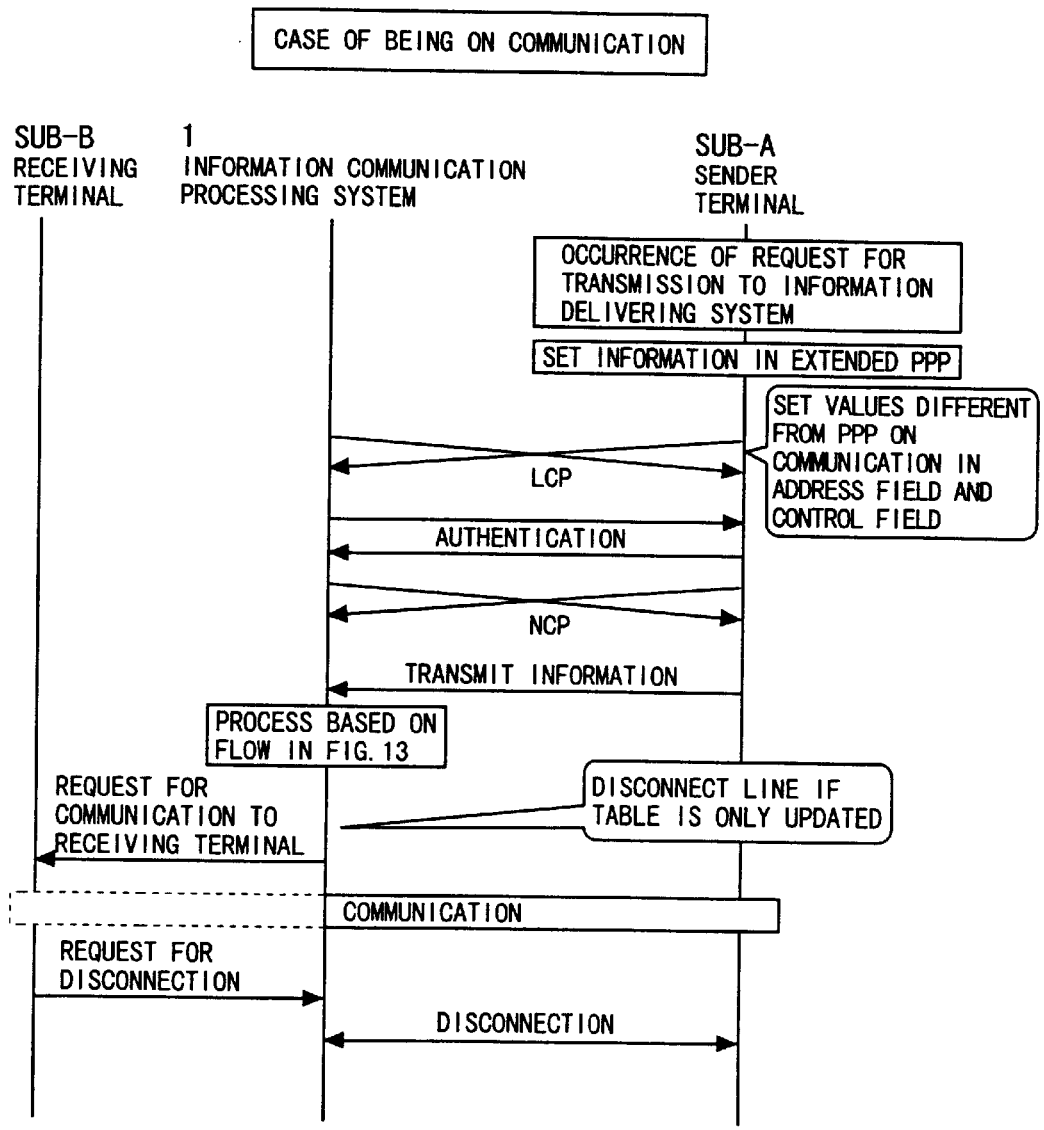

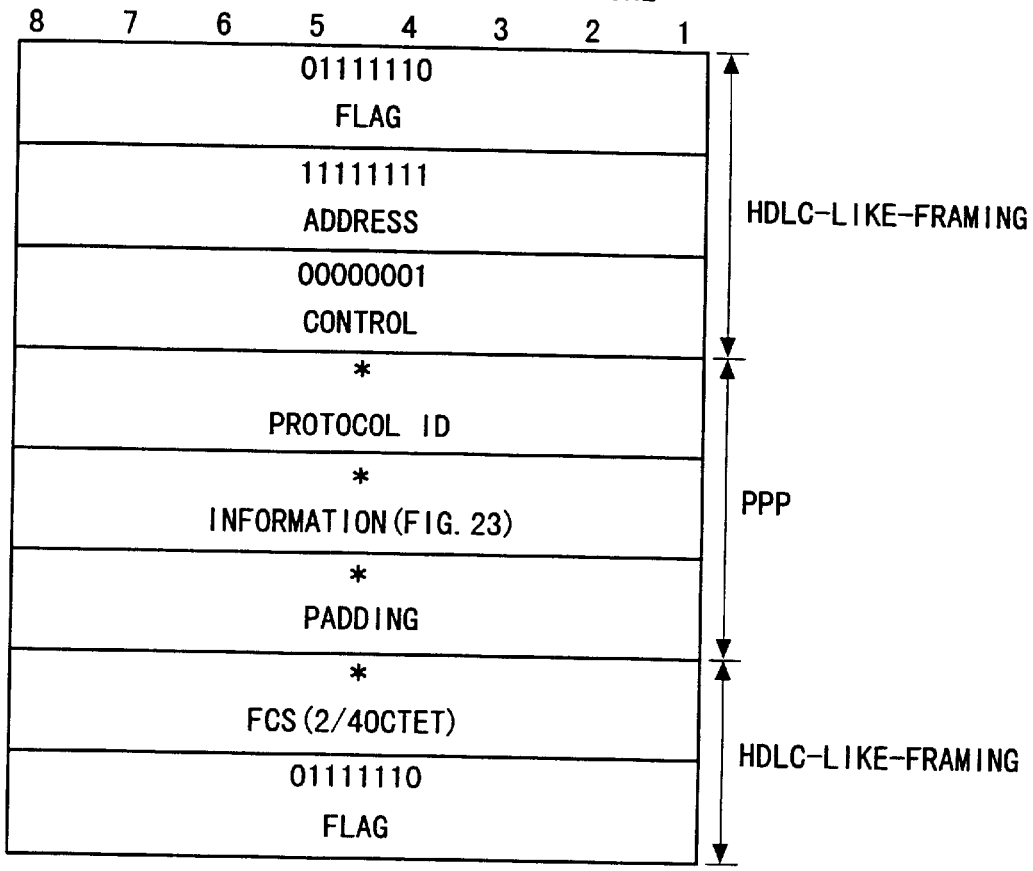

FIG. 23
PPP FRAME STRUCTURE

INFORMATION MODULE

| 8 | 7 | 6 | 5 | 4 | 3 | 2 | 1 |
|---|---|---|---|---|---|---|---|
| \multicolumn{8}{|c|}{00000001 TABLE INFORMATION} |

```
┌─────────────────────────────────────────┐
│              00000001                   │
│           TABLE INFORMATION             │
├─────────────────────────────────────────┤
│                  *                      │
│       (LENGTH OF CONTENT OF USER NAME)  │
├─────────────────────────────────────────┤
│                  *                      │
│          (CONTENT OF USER NAME)         │
├─────────────────────────────────────────┤
│                  *                      │
│       (LENGTH OF CONTENT OF PASSWORD)   │
├─────────────────────────────────────────┤
│                  *                      │
│          (CONTENT OF PASSOWRD)          │
├─────────────────────────────────────────┤
│                  *                      │
│           (LATEST UPDATED DATE)         │
├────────────────────┬────────────────────┤
│       0000         │       0001         │
│ (NORMAL/SPECIFYING │  (CONVERT TARGET   │
│    IDENTIFIER)     │  MEDIA IDENTIFIER) │
├────────────────────┼────────────────────┤
│       0100         │         *          │
│ (CONVERTED TARGET  │ (LENGTH OF CONTENT │
│  MEDIA IDENTIFIER) │   OF DESTINATION)  │
├─────────────────────────────────────────┤
│                  *                      │
│         (CONTENT OF DESTINATION)        │
├────────────────────┬────────────────────┤
│       0001         │       0001         │
│ (NORMAL/SPECIFYING │  (CONVERT TARGET   │
│    IDENTIFIER)     │  MEDIA IDENTIFIER) │
├────────────────────┼────────────────────┤
│       0100         │         *          │
│ (CONVERTED TARGET  │    (LENGTH OF      │
│  MEDIA IDENTIFIER) │ SPECIFIED TERMINAL)│
├─────────────────────────────────────────┤
│                  *                      │
│   (CONTENT OF SPECIFIED TARGET TERMINAL)│
├─────────────────────────────────────────┤
│                  *                      │
│     (LENGTH OF CONTENT OF DESTINATON)   │
├─────────────────────────────────────────┤
│                  *                      │
│         (CONTENT OF DESTINATION)        │
└─────────────────────────────────────────┘
```

NORMAL/SPECIFYING IDENTIFIER
- 0000 NORMAL
- 0001 SPECIFIED

MEDIA IDENTIFIER
- 0000 NO CONVERSION
- 0001 TELEPHONE
- 0010 IP TELEPHONE
- 0011 E-MAIL
- 0100 UUI MAIL
- 0101 IDENPENDENT SYSTEM MAIL OF xx COMPANY
- 0110 MESSAGE
- 0111 FAX

PPP FRAME STRUCTURE

FIG. 25A

TBL2 INFORMATION COMMUNICATION PROCESSING SYSTEM RETAINING TABLE (BEFORE UPDATED)

| USER NAME | Fujitsu hanako | | | |
|---|---|---|---|---|
| PASSWORD | Fujitsu2 | | | |
| LATEST UPDATED DATE | 20000228191530 | | | |
| MEDIA | NORMAL PROCESS | | SPECIFYING PROCESS | |
| | PROCESS | DESTINATION | TARGET TERMINAL | PROCESS | DESTINATION |
| TELEPHONE (NUMBER) | NO CONVERSION | | | | |
| IP TELEPHONE (IP ADDRESS, TELEPHONE NUMBER) | TELEPHONE | 044-888-xxxx | | | |
| E-MAIL (MAIL ADDRESS) | TELEPHONE | 044-888-xxxx | zz@xx.com | DISCARD | |
| MESSAGE (IP ADDRESS, TELEPHONE NUMBER) | TELEPHONE | 044-888-xxxx | | | |

FIG. 25B

TBL2 INFORMATION COMMUNICATION PROCESSING SYSTEM RETAINING TABLE (AFTER UPDATED)

| USER NAME | Fujitsu hanako | | | |
|---|---|---|---|---|
| PASSWORD | Fujitsu2 | | | |
| LATEST UPDATED DATE | 20000229000532 | | | |
| MEDIA | NORMAL PROCESS || SPECIFYING PROCESS ||
| | PROCESS | DESTINATION | TARGET TERMINAL | PROCESS | DESTINATION |
| TELEPHONE (NUMBER) | IP TELEPHONE | 133.161.252.xxx | | | |
| IP TELEPHONE (IP ADDRESS) | NO CONVERSION | | | | |
| E-MAIL (MAIL ADDRESS) | IP TELEPHONE | 133.161.252.xxx | zz@xx.com | DISCARD | |
| MESSAGE (IP ADDRESS) | IP TELEPHONE | 133.161.252.xxx | | | |

FIG. 28

TBL2

| USER NAME | Fujitsu ichiro | | | | |
|---|---|---|---|---|---|
| PASSWORD | Fujitsu3 | | | | |
| LATEST UPDATED DATE | 20000229032610 | | | | |
| MEDIA | NORMAL PROCESS | | SPECIFYING PROCESS | | |
| | PROCESS | DESTINATION | TARGET TERMINAL | PROCESS | DESTINATION |
| TELEPHONE (NUMBER) | UUI MAIL | 070-9999-xxxx | | | |
| IP TELEPHONE (IP ADDRESS) | UUI MAIL | 070-9999-xxxx | | | |
| E-MAIL (MAIL ADDRESS) | UUI MAIL | 070-9999-xxxx | | | |
| UUI MAIL (NUMBER) | NO CONVERSION | | | | |
| MESSAGE (IP ADDRESS) | UUI MAIL | 070-9999-xxxx | | | |
| FAX (NUMBER) | UUI MAIL | 070-9999-xxxx | | | |

MEDIA CONVERT SERVICE PROVIDING METHOD

BACKGROUND OF THE INVENTION

The present invention relates generally to a media convert type information communication system capable of receiving information sent by an arbitrary information expression medium from a sender in communications between terminals of different categories by another information expression medium desired by a receiver, and more particularly to a media convert service providing method capable of specifying the receiving media convert category and the receiving terminal category by use of a specified communication protocol.

Carriers or ISPs (Internet Service Providers) have been providing communication services involving a variety of information expression media (which might hereinafter be simply referred to as media) irrespective of voices, images and texts with developments of computers, communication devices and the Internet technology over the recent years. Each communication service is actualized by use of a different communication system, a different protocol and a different medium, and hence, unless a communication system incorporates modules for converting the media and protocols, the mutual communications could not be attained.

Recently, however, a communication system for converting a certain medium into a different medium and transmitting the information via the converted medium, starts appearing. For example, there are actually provided a service for converting the information received by an E-mail into information of a facsimile (FAX) and thus transmitting the information, and a service for taking out the information of the E-mails stacked in a server in voice by use of a telephone line.

With developments of the media convert technology such as text formatting based on a voice recognition, voice formatting based on reading out a text and text data formatting of image data of FAX etc (OCR: Optical Character Reading), a communication service for converting a plurality of different media into each other comes to its realizable stage. Further, an individual (one subscriber or terminal user) comes to have plural types of terminals. This leads to a strong market demand for one-dimensionally managing the communication data, and hence it is considered that the above communication service will rapidly spread from now on into the future.

A media convert service for integrating the media of all categories and effect the media conversion is not yet actualized, however, its method has already been proposed. For instance, according to a system disclosed in Japanese Patent Application Laying-Open Publication No. 11-17806, when receiving the communication information from a transmitting side, a medium is converted corresponding to a necessity on the basis of registered information on a receiving side, and thereafter the communication information is transmitted to the receiving side.

Further, many methods are proposed in order to obtained a more enhanced usability of the communication service. For instance, a system disclosed in Japanese Patent Application Laying-Open Publication No. 9-200250, when an E-mail requiring an urgency arrives, always monitors whether the E-mail is read or not and, if not read for a given period of time, the mail arrival or a mail content is transmitted to the receiving side by selecting a substitute communication means.

In the media convert type information communication system disclosed in Japanese Patent Application Laying-Open Publication No. 11-17806, no specific information transmitting means between a relay and a terminal is mentioned, and besides an informing method when an emergency occurs is not considered.

Further, according to the system disclosed in Japanese Patent Application Laying-Open Publication No. 9-200250, there is no method of converting the medium and integrally informing of the urgency in an environment where the E-mail can not be delivered. Even when integrating the above two systems disclosed in the Publications given above, the message is unable to be transmitted in case the urgency occurs in the midst of performing the communications on a telephone, a mobile telephone etc, and therefore the information is transmitted via other converted medium, with the result that the information might not be transmitted to the terminal of a category desired by the receiver.

Moreover, the systems devised so far, when the network-sided device converts a medium and changes a destination of transmission, have no means of informing the sender of a converting method and the destination of transmission. In addition, if a power source of a terminal such as a mobile telephone and a personal computer (PC) held by the receiver is not switched ON, there is absolutely no method of transmitting a message.

Even when receiving a message requiring an urgency, simply the arrival of the message is transmitted to the communicable terminal, and the urgent matter might not be conveyed to the receiving side. The conventional systems are incapable of executing a process against a specified sender as in the case of [Annoyance Call Auto Reject Service] generally conducted in the telephone services.

In addition to these problems existing in the system, an interface for the user also has a problem. This problem is that the operation is complicated, and hence, if the number of media handled by the media convert type information communication system increases, the settings must be done for all the media.

It is presumed that the information communication services will be more diversified in their categories and the number of users will also increase, however, even if a system is configured by combining the conventional technologies, it is difficult to provide services that can meet demands of the terminal users (subscribers).

SUMMARY OF THE INVENTION

Accordingly, it is a primary object of the present invention to provide a media convert service providing method capable of configuring an extended system of a conventional media convert type information communication system, and providing a much higher usability to terminal users (senders and receivers).

To accomplish the above object, according to a first aspect of the present invention, a media convert service providing method comprises a step of utilizing a free usable field or a blank field in a frame based on a specified communication protocol, a step of sorting out specified pieces of information according to receiving media convert categories and receiving terminal categories, and a step of enabling the specified information to be registered in an information communication processing system on a communication network.

According to a multiplicity of communication protocols, a field that can be used the terminal user as the user intends is defined. Further, even if the free usable field is not defined, there is the blank field that is not utilized for performing the communication, and hence this field is redefined as an independent protocol, thereby obtaining the same result.

This field is used for registering the information for specifying a category of the medium desired by the receiver and a type of the receiving terminal in the information communication processing system (media convert service providing system) provided on the network side, whereby the media convert type information communication system can be actually constructed. An advantage thereof is that a certain service and function can be provided on the existing communication protocol without scheming new different protocol specifications.

According to a second aspect of the present invention, a media convert service providing method comprises a step of utilizing a free usable transmission field of signaling information in a UUI frame based on an existing communication protocol, a step of sorting out specified pieces of information according to receiving media convert categories and receiving terminal categories, and a step of enabling the specified information to be registered in an information communication processing system on a communication network.

In ISDN, a mobile telephone, a PHS (Personal Handyphone System) and a next generation mobile communication system IMT2000 (W-CDMA/cdma2000) that will provide services from now on into the future, a user network interface (ITU-T Q.931 etc) defines a band for UUI (User-to-User Information) as a 128-byte (octet) message that can be freely dealt with by users.

This band is utilized at present for transferring and receiving a message for maintenance, transmitting a simple message (see:www.ttc.or.jp/j/ucg/ucg2/contents/apl/wglspec.p df), and notifying the user of a mail arrival to a mail server (see:www.biglobe.nejp/info/uuiex).

The media convert type information communication system can be actually configured by use of UUI for registering, in the information communication processing system, the information for specifying a medium desired by the receiver and a receiving terminal.

Further, a fee for using UUI in Japan is 0.4 yen/use, and UUI can be used free of charge in some areas in U.S.A. Therefore, the information can be transmitted and received at a lower cost than the conventional fee (generally, 10 yen/use). Moreover, UUI is classified as signaling information and transmitted in a band different from the actual communication bands, and hence an advantage is that the information can be transmitted and received even when the terminal is on the communications.

According to a third aspect of the present invention, a media convert service providing method comprises a step of utilizing extended PPP in which a value of a control field in a PPP frame based on a existing communication protocol PPP is a variable code value, a step of sorting out specified pieces of information according to receiving media convert categories and receiving terminal categories, and a step of enabling the specified information to be registered in an information communication processing system on a communication network.

The terminal making a dial-up access to the Internet by use of an analog telephone and xDSL (x Digital Subscriber Line) typified by ADSL (Asymmetric Digital Subscriber Line), uses PPP (Point-to-Point Protocol prescribed by IETFREC1661) for running IP (Internet Protocol) on the transmission path.

PPP is capable of establishing only one PPP connection on a single line, however, a plurality of connections can be established by use of an extended PPP technology disclosed in Japanese Patent Application No. 11-257452 (filed on Sep. 10, 1999). This extended PPP technology involves the use of an extended PPP frame in which values of an address field and of a control field in a PPP frame are set as variable code values.

According to the media convert service providing method of the present invention, a different PPP line from the PPP line in which the normal communications are carried out is established by using this extended PPP, and the information arranged according to the receiving terminal categories and the media categories desired by the receiver, is registered in the network-sided information communication processing system by use of a logic circuit thereof.

With this architecture, the media convert type information communication system can be actually configured. An advantage thereof is that this architecture does not hinder the normal data communications, and hence the information can be transmitted and received even when the terminal is in the process of performing the communications.

According to a fourth aspect of the present invention, in a media convert service, the sender is notified of which medium and which terminal the receiver receives the information from.

According to the media convert service providing method, when converting the medium and changing the destination of transmission on the network side, the information on this operation is provided to the sender, thus enhancing a usability to the sender and the receiver as well.

According to a fifth aspect of the present invention, in the media convert service, if the sender requires an urgency, the specified information registered by the receiver is ignored, and the communication information is transmitted by use of all possible media and receiving terminals.

When the urgent communication information is transmitted to the receiving terminal, the information communication processing system on the network side ignores the registered setting of the receiver, and the communication information is transmitted to all the registered destinations by the respective methods. The communication information can be transmitted repeatedly till the receiving side makes a response.

In this case, if the urgent communication information is received on the receiving side, the information communication processing system is given a notification that no further communication information should be transmitted by use of UUI or the communication protocol such as the extended PPP. The information communication processing system receiving this notification stops transmitting the communication information. The information can be thereby delivered to the receiver from the sender more surely than by the prior art.

According to a sixth aspect of the present invention, in the media convert service, the receiver registers the information on a specified sender and executes the specifying process.

In recent years, there has arisen a problem that the receiver is troubled with receiving undesired information as by a harassing phone, a chain mail or a spam mail. According to the present media convert service providing method, if these pieces of information are transmitted to the receiver, a different process from the normal process is executed by registering the information on such senders in the information communication processing system. For example, an unacceptable message is sent back to the sender, and that sort of information is discarded and, besides, may also be transferred directly to an institute such as a national or private information harassment monitoring center, thereby enhancing a usability to the users.

According to a seventh aspect of the present invention, in the media convert service, the receiving media convert categories and the receiving terminal categories are registered corresponding to a plurality of destinations, thereby enabling the multicast communications to be performed.

When the information is sent to the receiver by a certain medium, normally the medium is converted based of the registered information if necessary, and the information is transmitted to a single certain terminal. However, a plurality of destinations are registered, and the information is set to be transmitted, thereby making it feasible to transmit the communication information to the plurality of terminals possessed by one certain user or the terminals possessed by a plurality of users and enhancing the usability to the user.

According to an eighth aspect of the present invention, in the media convert service, the information communication processing system and all the terminals possessed by a certain user share the same set information, and a copy of the information is transmitted to a terminal with no setting being done.

If the user purchases a new terminal, it has hitherto been required that all the settings be conducted for this terminal. However, the information communication processing system and the all the terminals share the same set information, whereby the information communication processing system sends the copy of the information to the terminal with no setting being done, the setting is thus simplified, and the usability to the user is enhanced.

According to a ninth aspect of the present invention, in the media convert service, the receiving conditions at the respective terminals are set batchwise.

When the receiver sets the receiving media convert category and receiving terminal category, it is possible to effect such a batchwise setting that all the receivable media are converted into one medium, and the information is received by one receiving terminal. The receiver is thereby able to execute the setting in all the media without any complicated setting, and the usability to the user is enhanced.

According to a tenth aspect of the present invention, in the media convert service, if the power source of the receiving terminal is not switched ON, the power source of the receiving terminal is switched On interlocking with the a device of which a power source is always kept ON, and the communication information is thus transmitted.

If the terminal is connected to an ISDN line via a TA (Terminal Adapter) and a SOHO (Small Office Home Office) router and connected to an xDSL (x Digital Subscriber Line) via a DSU (Digital Service Unit), normally power sources of the TA, SOHO router and DSU have already been switched ON.

According to this media convert service providing method, if the power source of the receiving terminal is not switched ON, the information communication processing system indicates the TA, SOHO router and DSU to switch ON the power source of the terminal and to get the terminal connected to the communication network. Thereafter, the information communication processing system transmits the information to the terminal. Unlike the conventional remote control, the sender may execute none of the operations, and the information is forcibly sent, which may be given as an advantageous point.

Many method of indicating the terminal to switch ON the power source thereof, can be considered. For example, a PPP callback (defined in IETF draft-ietf-pppext-callback-ds-02.txt) may be used. The PPP callback functions to make a negotiation with respect to a telephone number redialed by the receiving side between the transmitting side and the receiving side, wherein the line is once disconnected after a completion of the negotiation, and the telephone number negotiated is redialed.

According to the present media convert service providing method, a request for the PPP callback is led to a judgement of giving the indication to switch ON the power source, and the power source of the terminal is switched On before dialing the telephone number negotiated. The terminal is preset so as to execute an auto dialup, whereby the connection to the communication network is made and thereafter the communication information is delivered to the terminal.

In addition, the following contrivance may also be adopted, wherein the power source is switched On by use of UUI, a specified telephone number of the information communication processing system is set in the TA, SOHO router and DSU, what is transmitted from that number may be conceived as an indication of switching ON the power source.

There can be considered many methods of switching On the Power source of the terminal, however, the method given herein is that the power supply of the terminal is taken out of the TA, SOHO router and DSU and thereby switched ON based on judgements of the TA, SOHO router and DSU.

Especially when urgent, the information is delivered to the receiver by the above method more surely than by the prior art.

According to the present invention, the society embraces coexistence of multi-types of terminals at the present, wherein the electronic communications exhibiting the high usability to the terminal users (subscribers) can be provided by simple settings and extending the system without depending on the specified medium. This may make a large contribution to a development in the sector of the information communications.

According to the present invention, the usability is by far more enhanced than the conventional media convert type information communication system particularly in terms of configuring the system capable of notifying of the urgent information with a certainty, providing its service, configuring the system incorporating the mechanism for switching ON the power source of the terminal, providing its service, configuring the system capable of copying all kinds of media at the relay point and multicasting the information to the plurality of terminals and providing its service.

Further, according to the present invention, the system is configured based on the existing communication protocol UUI/PPP showing more of general-purposes, and therefore the advantage is that the system can be actualized by its extension on a small scale.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which:

FIG. 1 is a block diagram showing an architecture of a media convert type information communication system in one embodiment of the present invention;

FIG. 2 is an explanatory diagram showing media dealt with by an information communication processing system on a communication network, and functions thereof;

FIG. 3 is a diagram showing a system architecture in a first operational example;

FIG. 5 is a table retained by a terminal in the first operational example;

FIG. 9 is a diagram showing a structure of a UUI frame;

FIG. 12 is a table retained by a terminal in the first operational example;

FIG. 15 is a media convert operation table of the information communication processing system;

FIG. 16 is a sequence chart (ISDN/mobile) of transmission to the information communication processing system;

FIG. 21 is a sequence chart (PPP) of transmission to the information communication processing system;

FIG. 22 is a diagram showing a structure of a PPP frame;

FIG. 23 is a diagram showing a structure of the PPP frame;

FIG. 25 is a diagram showing a table retained by the information communication processing system in the second operational example;

FIG. 28 is a diagram showing a table retained by the information communication processing system in the third operational example.

DETAILED DESCRIPTION OF THE PREFERRED EMBODIMENTS

Figure 4A:
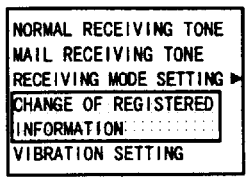
FIG. 4 is a terminal set screen in the first operational example.
Figure 4B:
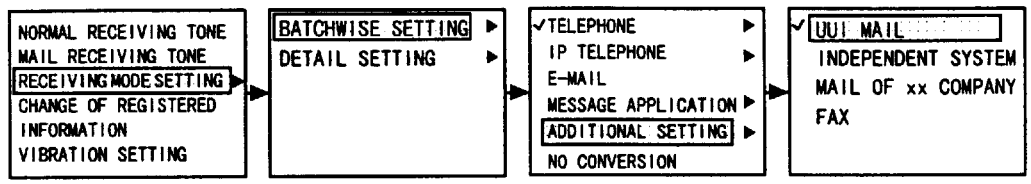
Figure 4C:
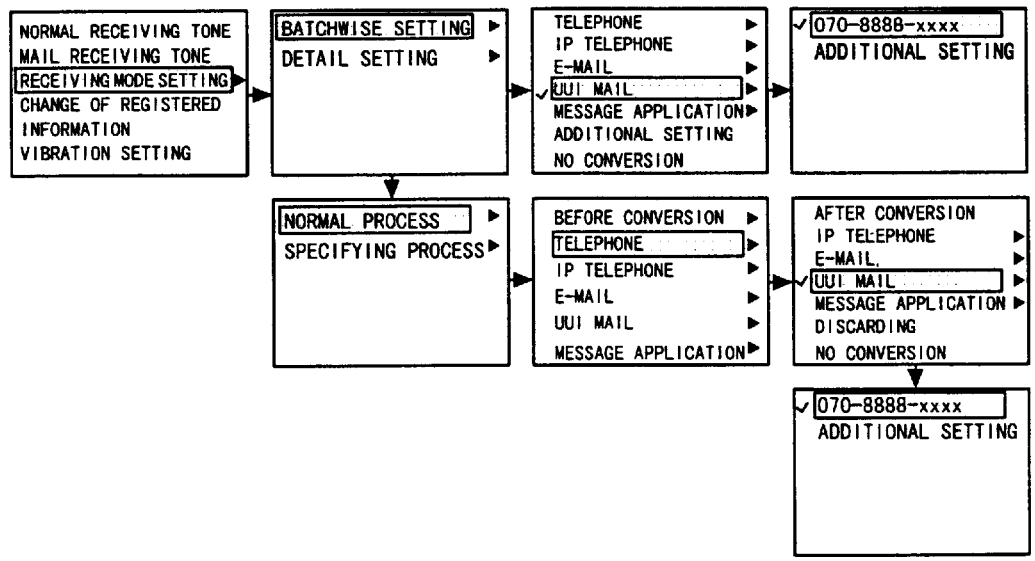
Figure 4D:
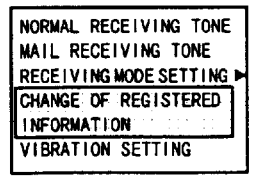

Next, embodiments of the present invention will hereinafter be described with reference to the accompanying drawings.

[Architecture of Media Convert Type Information Communication System]

FIG. 1 shows an architecture of a media convert type information communication system in one embodiment of the present invention. Referring to FIG. 1, this system is configured by a variety of terminals (a telephone, a mobile telephone, a PHS (Personal Handy-phone System), an ISDN telephone, a TA/(or) SOHO (Terminal Adapter/(or) Small Office Home Office) router for ISDN, a DSU (Digital Service Unit) such as FWA/wireless LAN/xDSL/CATV (Fixed Wireless Access/wireless Local Area Network/x Digital Subscriber Line/Cable Television), a PC (Personal Computer), a facsimile terminal FAX, a game machine etc) SUB, network-sided devices (a server, a switch, a router etc) 2, 3, 4, 5, and 6 corresponding to the respective terminals, and a variety of networks (a telephone network, a mobile communication network, Internet etc) 8, 9, and BS.

Each terminal SUB is connected to an information communication processing system (media conversion service providing system) 1 via a network using its circuit and protocol. Each terminal SUB is further connected to other terminal SUB via at least one of a telephone network 8, the Internet 9 and a telephone network/Internet connection device 10.

In the case of a mobile terminal, the mobile terminal is connected to a mobile switch 2 via an antenna provided in a certain area. The ISDN telephone, FAX and the SOHO router 7 are connected via a telephone line to a switch 3 for ISDN. An analog telephone, a PC directly connected to the analog telephone and a MODEM card of FAX are connected via the telephone line to a switch 4 for telephones.

The FWA and the wireless LAN are connected to a router/switch 5 for data switching via an antenna secured to a telephone pole etc. The xDSL does not extend to the switch of the telephone network via the telephone line, and is connected to the router/switch 5 for data switching. The CATV is connected to the data switching router/switch 5 of a CATV carrier via its own CATV cable.

According to this media convert type information communication system, one single information communication processing system 1 is constructed by integrating the network-sided devices dealing with different lines and protocols, or by connecting a plurality of network-sided devices to each other via a server 6 so that information is transferred to and received from each other. one single server 6 is logically provided for integrally managing the respective switches 2, 3, 4 and the router 5 and also the information of user terminals connected thereto. Physically, a plurality of servers 6 for distributing a load are provided in respective districts, thus taking such an architecture as to share the same data.

The switches are, though expressed by a single term, classified into a switch for ISDN, a switch for the telephone and a switch for the mobile communications. In the case of the router 5, a backbone network may be an ATM network or an IP network or a frame relay network or a packet network, and hence the information communication processing system 1 is required to have a variety of connection functions.

[Processing Media and Functions of Information Communication Processing System]

FIG. 2 shows information expression media processed by the information communication processing system 1 on the communication network, and functions incorporated into the system 1. The information expression media of the information transmitted from a sender via the information communication processing system 1 to a receiver may be exemplified such as telephones including mobile system telephones, IP telephones in which voice information is transmitted as IP packets, E-mails, UUI (User-to-User Information) mails (refer to www.ttc.or.jp/j/ucg/ucg2/contents/apl/wglspec.pdf) standardized by UCG of TTC (Telecommunication Technology Committee), mails based on an original system provided by a mobile system carrier such as NTT DoCoMo, J-Phone etc, messages based on a variety of message applications for transmitting the message directly to a receiving terminal by specifying an IP address, and FAX.

The information communication processing system 1 that relays these media encodes voices into voice data and reversely decodes the voice data into the voices, converts the voice data into text data and vice versa, and converts FAX data into the text data and vice versa.

The information communication processing system 1 is required to transmit various items of information to the terminals in communication formats supported by the individual terminals SUBS. Therefore, the information communication processing system 1 has a telephone function for the analog telephone, a telephone/UUI mail function to the mobile terminal, and an information transmission function for the mail based on the original system of each carrier. Further, the information communication processing system 1 has a telephone/UUI mail function for the ISDN telephone. The system 1 also has an IP telephone function, an E-mail function and a message function based on the variety of message applications on IP for the PC, and a FAX data transmission function for FAX.

[Structure of Database]

It is required for actualizing the above functions by the information communication processing system 1 that the information communication processing system 1 and the terminal SUB have tables TBL1, TBL2 as databases shown in FIGS. 5, 12, 25 and 28.

The tables TBL1, TBL2 are, though described in details in the following discussion on the operation, prepared for each user and are contrived so that the tables TBL1, TBL2 are unable to be changed by other users by giving a user name and a password and executing authentication. Further, the information communication processing system 1 and the respective terminals SUBS become capable of sharing the latest information at all times by having a date key updated last.

Moreover, a media conversion can be actualized by having pieces of information of a convert target medium and a converted medium and a delivery destination. In addition, the information communication processing system 1 and the terminals SUBS also have keys for registering specified terminals and processes in order to actualize an execution of specified processes of the information given from the specified terminals. Each table TBL1, TBL2 is sequentially updated in response to a request from the user.

[Outline of Operation of Media Convert Type Information Communication System]

It is required that operations shown in FIG. 15 be executed in order for the information communication processing system 1 to actualize the functions described above. Formats for transmitting the information are simply changed except for operations of converting the voices and the voice data and also converting the FAX data and the voice data.

Figure 13:
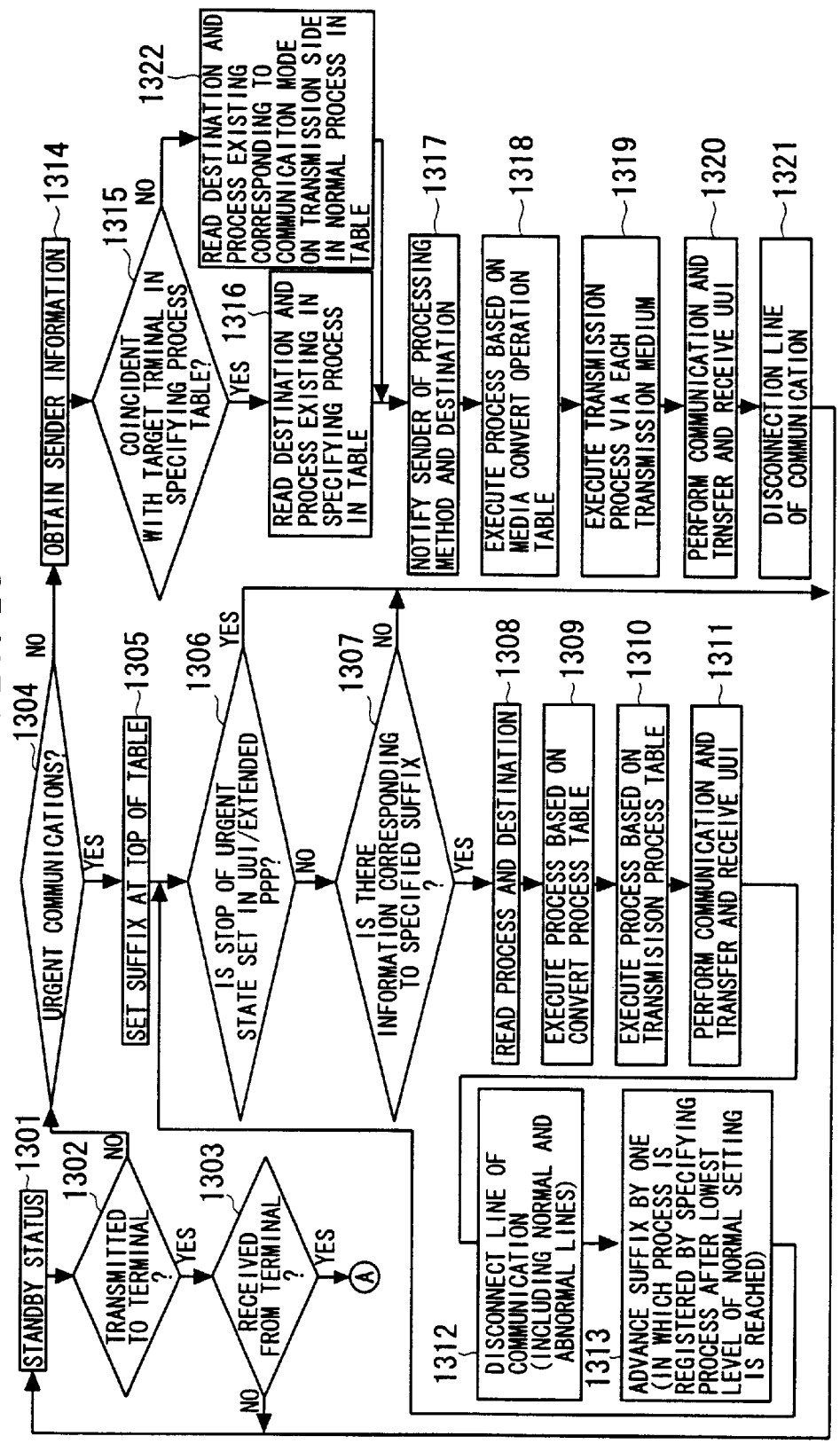
FIG. 13 is a flowchart showing operations of the information communication processing system.
Figure 14:
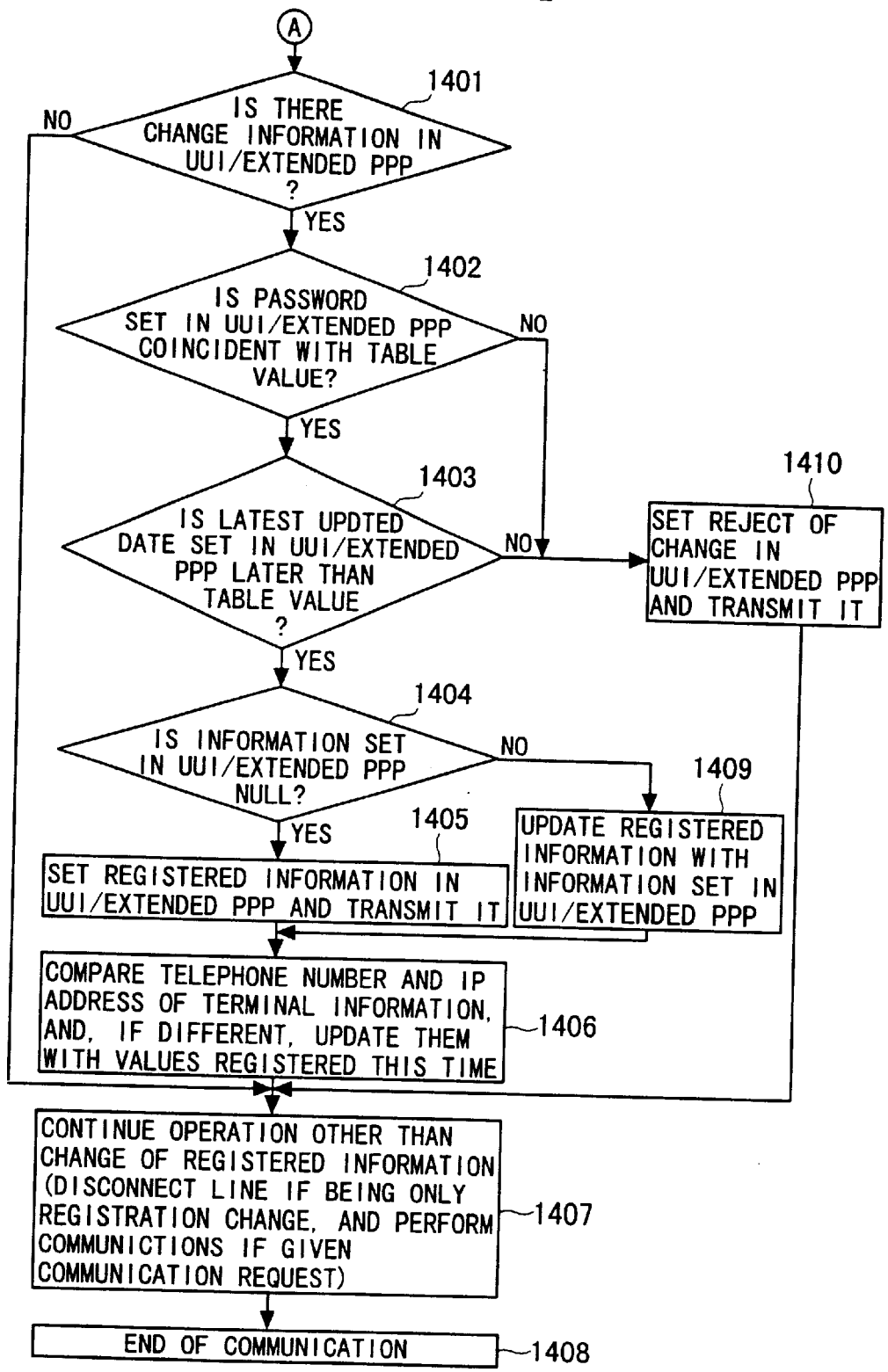
FIG. 14 is a flowchart showing operations of the information communication processing system.

FIGS. 13 and 14 are flowcharts showing the operations (steps 1301~1322, 1401~1410) of the information communication processing system 1. Normally, the information communication processing system 1 is in a standby status and monitors whether the information is transmitted to or received from the terminal SUB. When transmitting the information to the terminal SUB, the information communication processing system 1 judges whether or not the sender requests urgent communications. If urgent, the information communication processing system 1 executes an urgent process. Whereas if not urgent, the information communication processing system 1, after judging whether it is a specified terminal or not, performs the communications. When received from the terminal SUB, the information communication processing system 1, if desiring to change the registered information, carries out the communications after changing the registered information.

Figure 6:
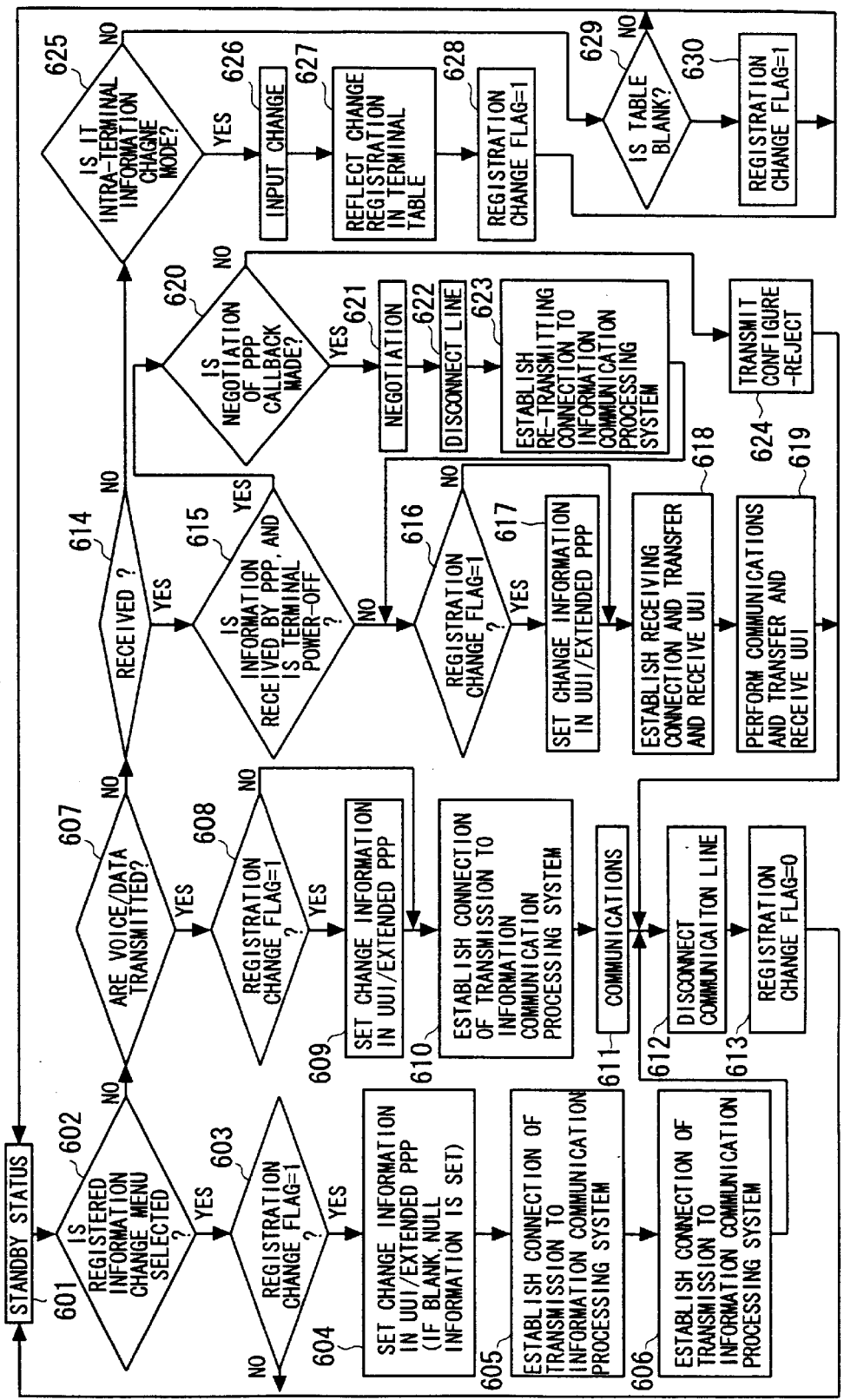
FIG. 6 is a flowchart showing an operation of a receiving terminal.

Further, FIG. 6 is a flowchart showing operations (steps 601~630) of the terminal SUB. The terminal SUB is normally in a standby status and monitors whether the information is transmitted or received. The terminal SUB, if the user changes the registration of the terminal SUB, notifies the information communication processing system 1 of this change when transmitted and received, and updates the table as the database. When transmitted, the terminal SUB thereafter performs the communications and, when received, conducts the communications after executing a process in a case where a power source of a device connected to the terminal SUB itself is not switched ON.

[First Operational Example: Case of Receiver Receiving Telephone Call by UUI Mail]

Figure 7:
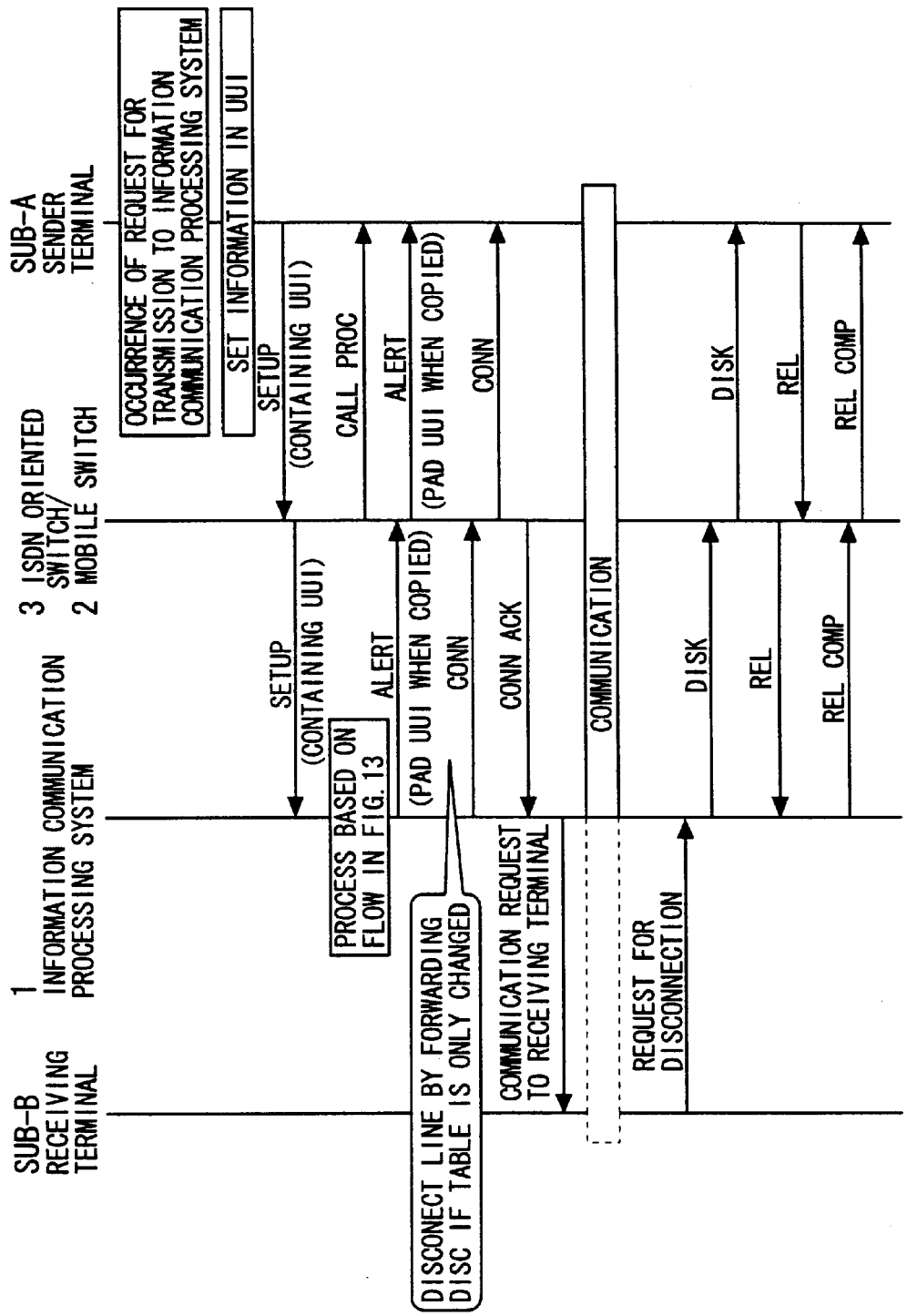
FIG. 7 is a sequence chart (ISDN/mobile) of transmission to the information communication processing system.
Figure 8:
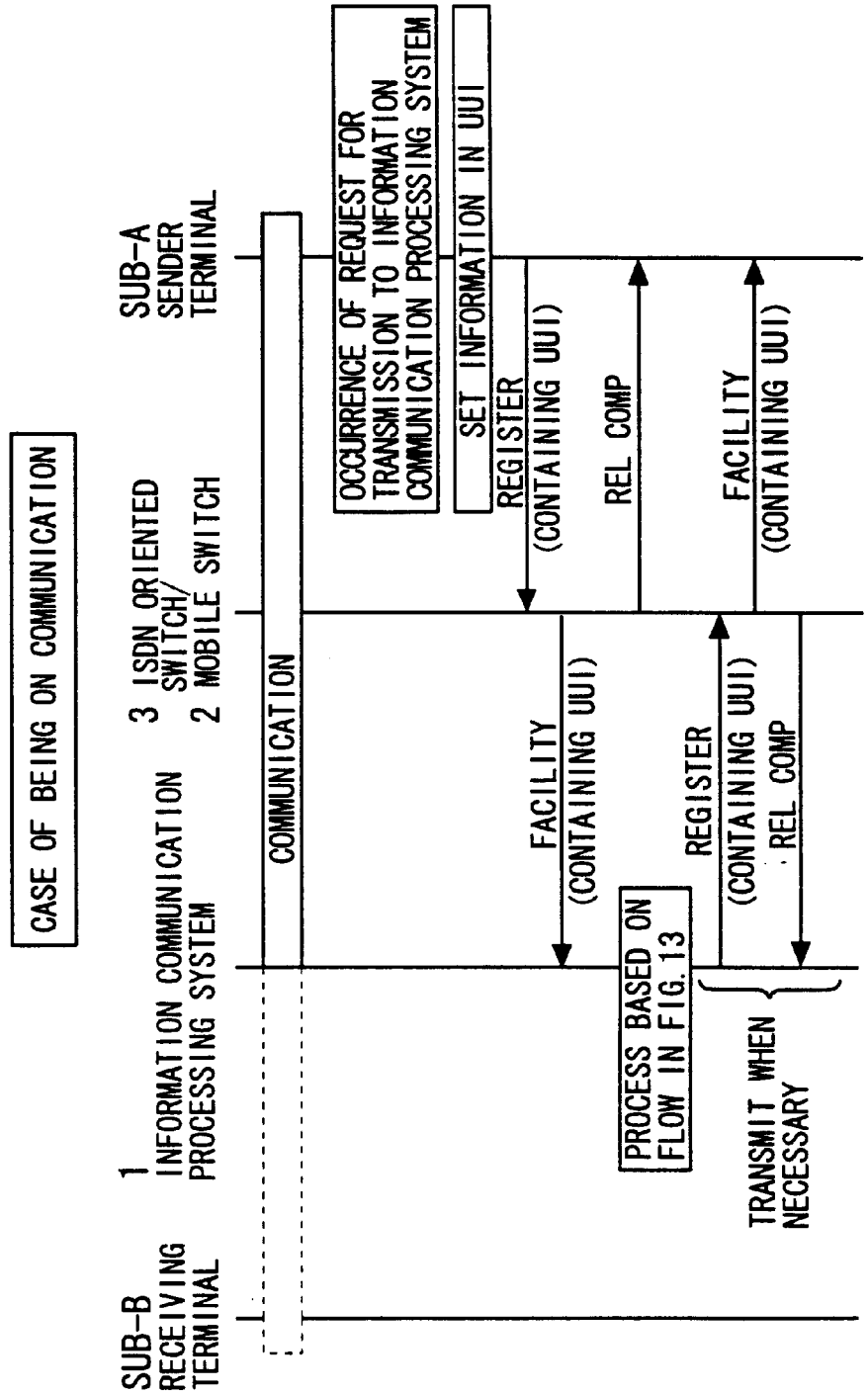
FIG. 8 is a sequence chart (ISDN/mobile) of transmission to the information communication processing system.
Figure 10:
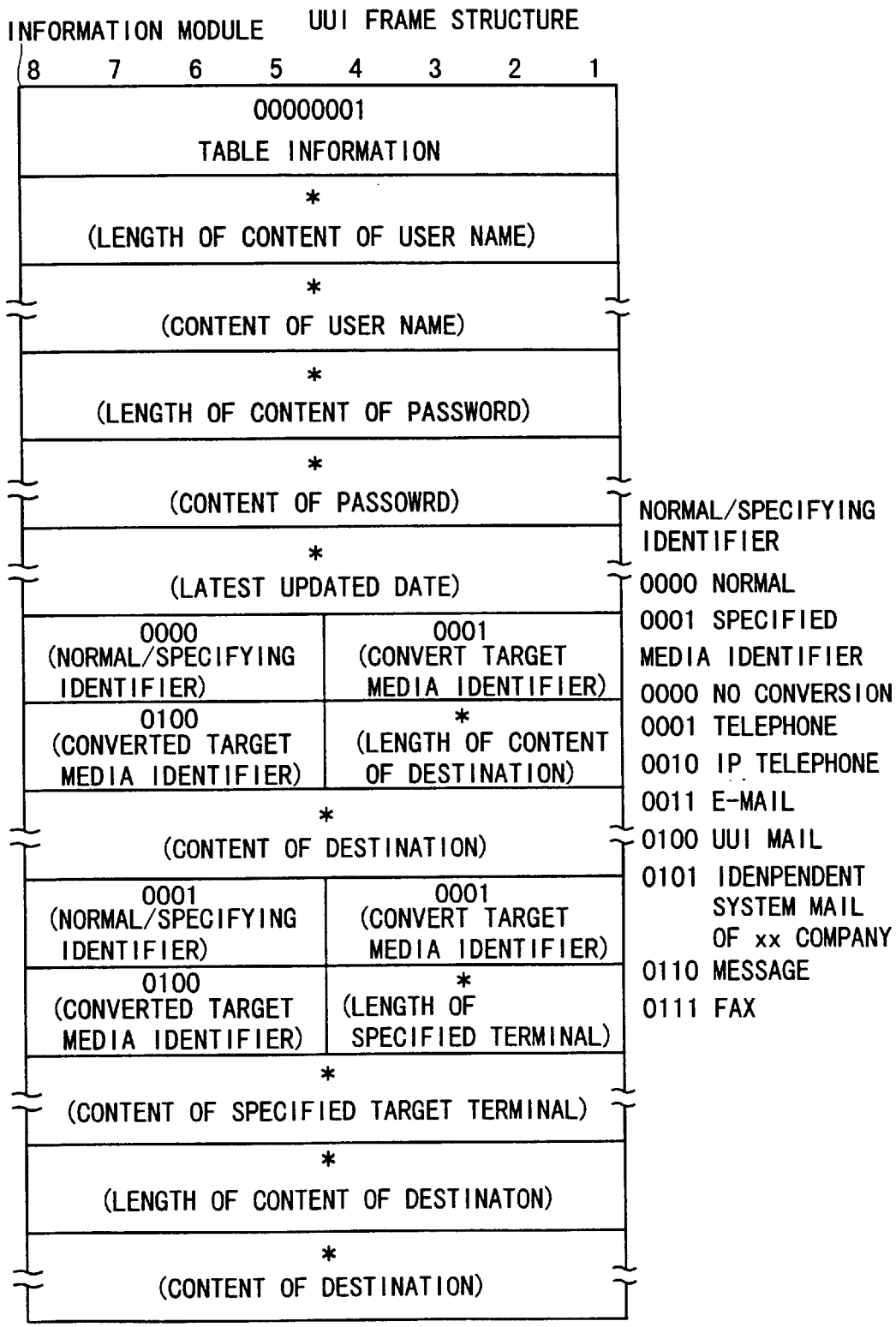
FIG. 10 is a diagram showing a structure of the UUI frame.
Figure 11A:
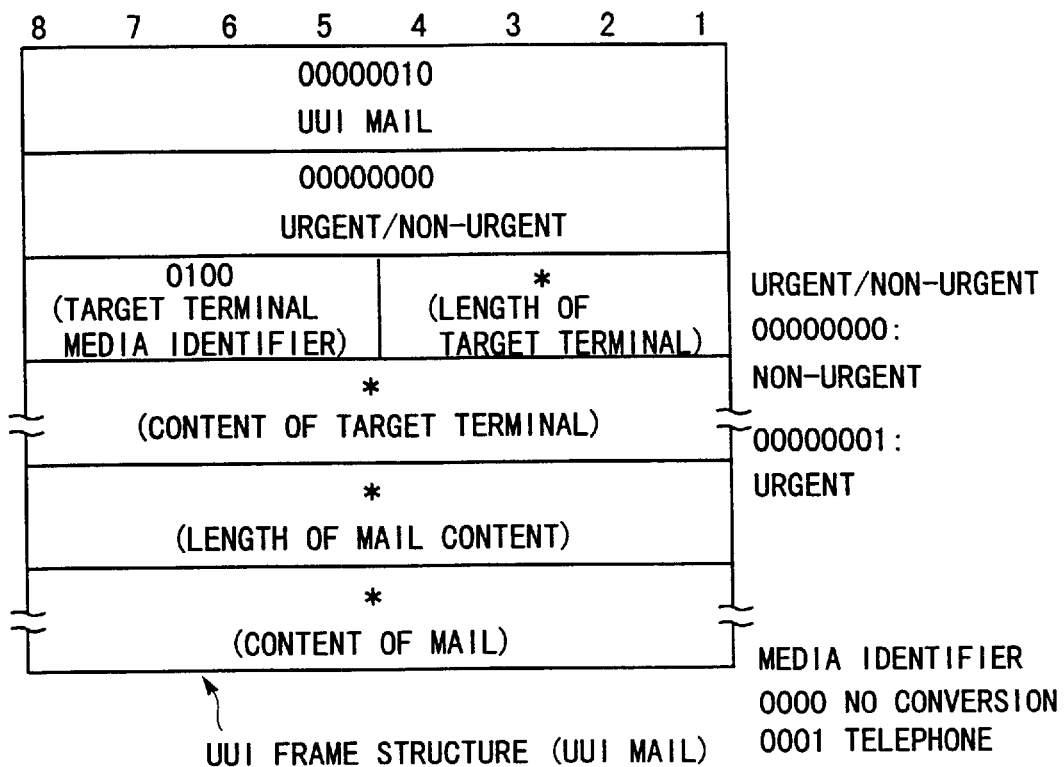
FIG. 11 is a diagram showing a structure of the UUI frame.
Figure 11B:
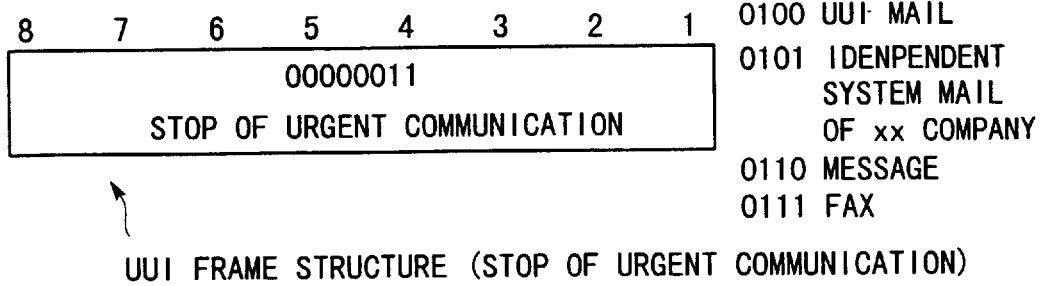
Figure 11C:
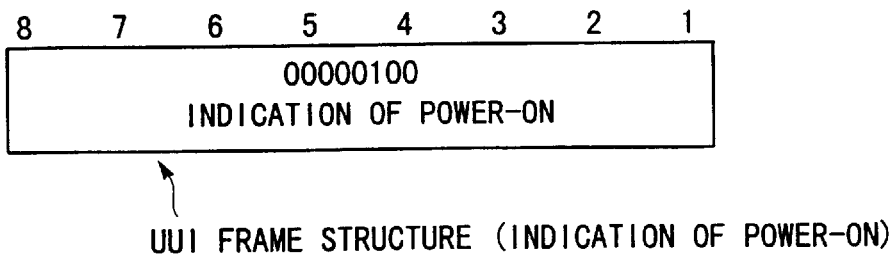
Figure 17:
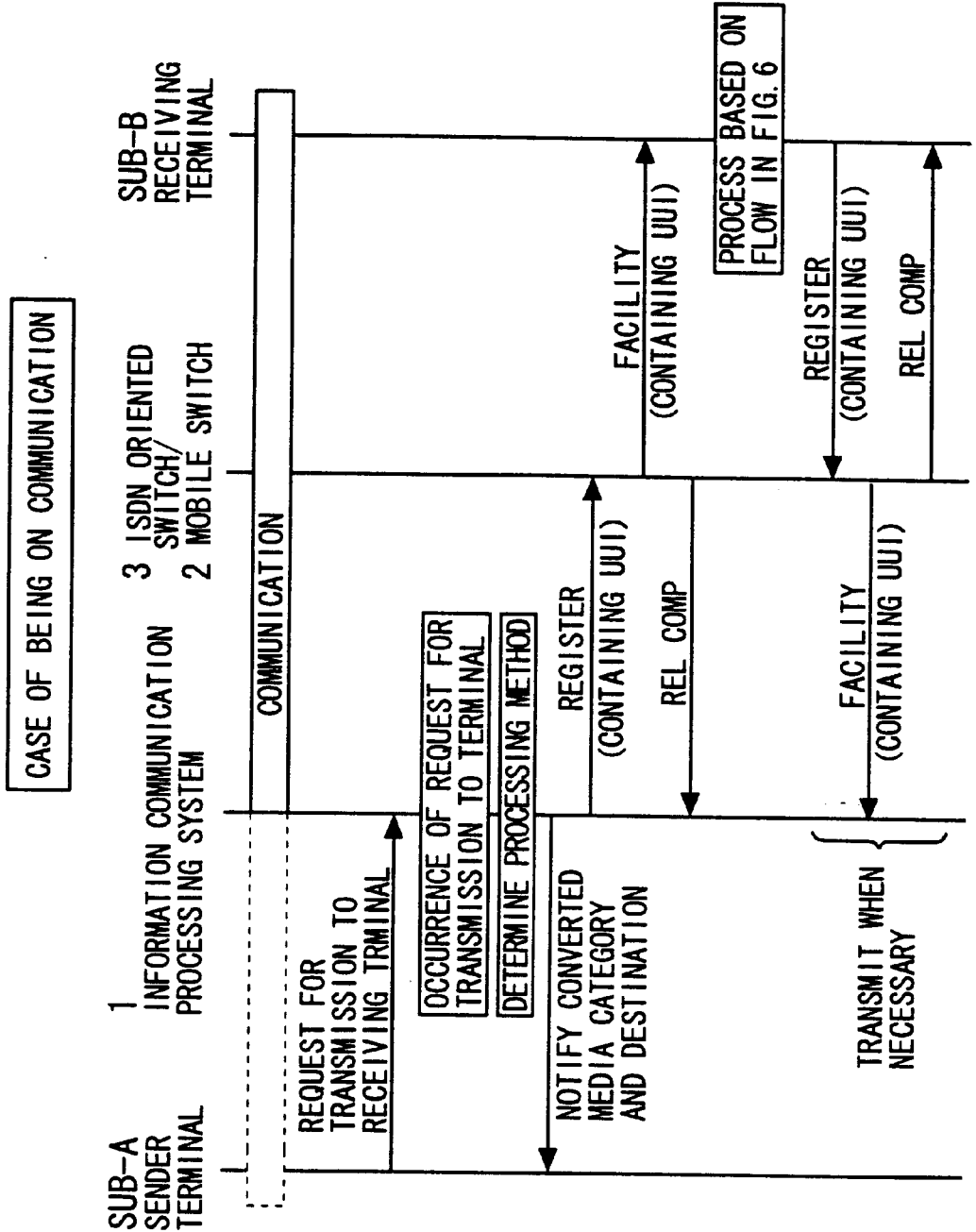
FIG. 17 is a sequence chart (ISDN/mobile) of transmission to the information communication processing system.
Figure 18:
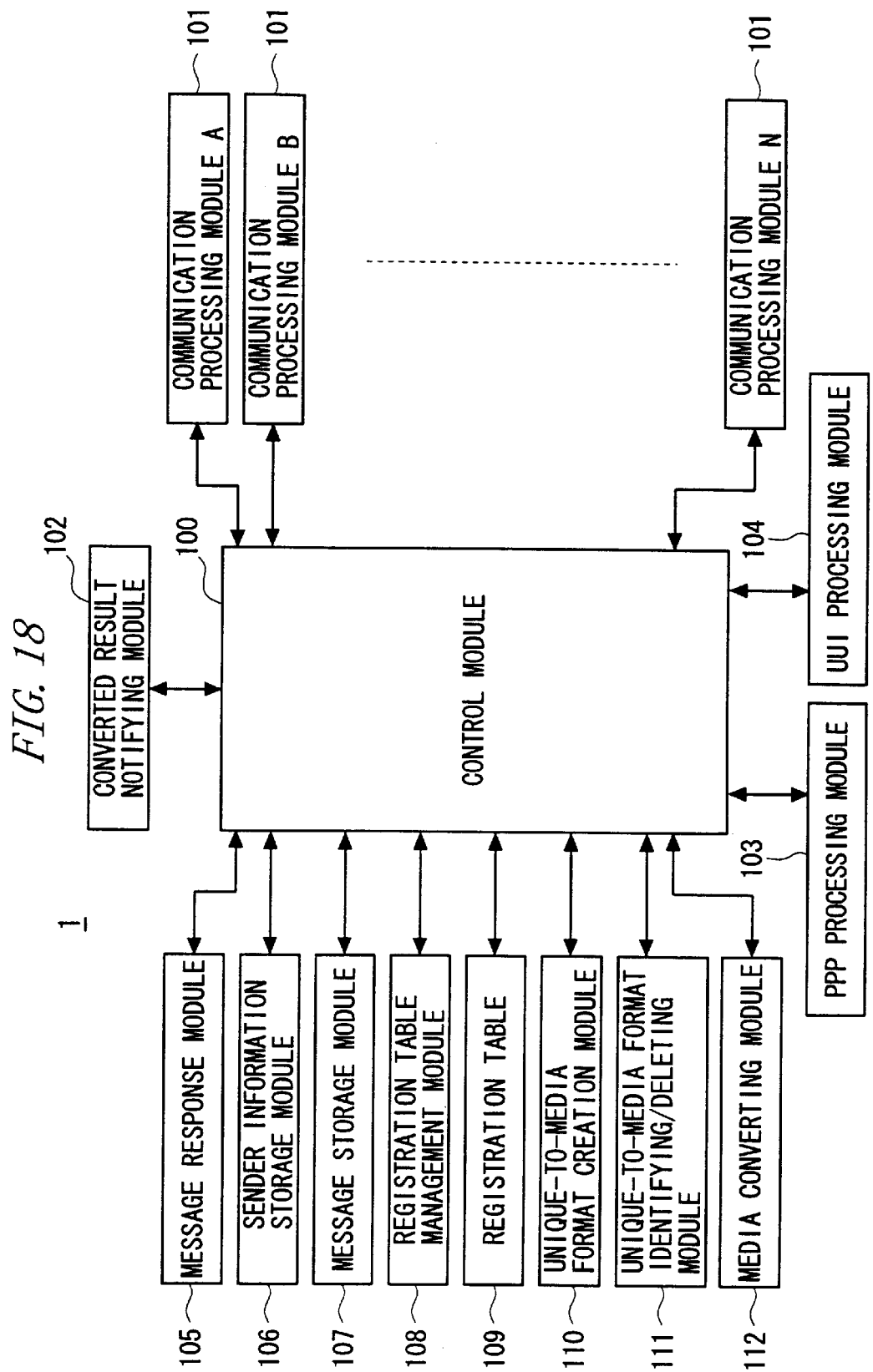
FIG. 18 is a block diagram showing the functions of the information communication processing system.

FIG. 3 is a view showing a system architecture. FIG. 4 is a diagram showing a set screen of the terminal. FIG. 5 is a table TBL1 retained by the terminal. FIG. 6 is a flowchart showing operations (steps 601~630) of a receiving terminal. FIGS. 7 and 8 are diagrams each showing a sequence of transmission to the information communication processing system 1 (ISDN/mobile). FIGS. 9 through 11 are diagrams each showing a UUI frame structure. FIG. 12 is a diagram showing a table retained by the information communication processing system 1. FIGS. 13 and 14 are flowcharts showing operations (steps 1301~1322, 1401~1410) of the information communication processing system 1. FIG. 15 is a diagram showing a table of media convert operations of the information communication processing system 1. FIGS. 16 and 17 are diagrams each showing a sequence of transmission to the terminal (ISDN/mobile). FIG. 18 is a block diagram showing the functions of the information communication processing system 1. A first operational example will hereinafter be described with reference to FIGS. 3 through 18.

In the media convert type information communication system, as illustrated in FIG. 3, a transmitting terminal (telephone) SUB-A of a sender is connectable via a telephone network 4 to the information communication processing system 1, and the information communication processing system 1 is connectable via a PHS network 2, BS to a receiving terminal (PHS) SUB-B of a receiver.

The receiver owns a telephone and a PC in receiver's home HM that are connected to the telephone network. The sender tries dialing (telephone number: 044-777-xxxx) to the receiver (called party) The receiver stays in his or her own home and receives all pieces of information via E-mails (address: zz@nifz.ne.xx). The receiver, however, goes outside and tries to register so as to receive all the information via the PHS. The receiver has, however, just bought this PHS and set nothing about this service.

Such being the case, to start with, the data registered in the information communication processing system 1 are copied to the PHS. The information communication processing system 1 and all the terminals hold the same information, and the setting is copied to terminals which have not been yet set, whereby the setting can be simplified and, in addition, a certain terminal is capable of changing the receiving conditions of other terminals.

For specifying a receiver who receives the information transmitted therethrough, the information communication processing system 1 holds pieces of information (a telephone number, a mail address and an IP address) for identifying the terminal SUB-B possessed by the receiver as seen in the table TBL2 in FIG. 12. These pieces of information are automatically changed based on the information given from the terminals, and therefore the users are unable to set.

As shown in the table TBL1 retained by the PHS terminal in FIG. 5, none of the information is registered in an initial status. As shown in FIG. 4, at first, [Change of Registered Information] is selected from a PHS menu. The PHS operates in accordance with a flow of operations of the receiving terminal in FIG. 6. Since the table is blank, a flag is set to [1]. The [Change of Registered Information] menu has been selected, the flag has been set to [1], and therefore the blank table is set in UUI in accordance with the formats in FIGS. 9 through 11.

Thereafter, a SETUP message is delivered to the information communication processing system 1 in accordance with the sequences in FIGS. 7 and 8. The information communication processing system 1 receiving the SETUP message from the terminal SUB-A operates based on a flow of operations in FIGS. 13 and 14. Explaining it referring to a block diagram in FIG. 18 in addition to the above Figures, to begin with, the SETUP message from the terminal SUB-A arrives at a communication processing module 101 that deals with the PHS network.

The table information is set in UUI, and hence a control module 100 transfers the same information to a UUI processing module 104. The UUI processing module 104 extracts a user name, a password, a latest updated date and set information out of the table information, and stores these data elements in a sender information storage module 106.

Next, a registration table management module 108 compares the information stored therein with contents of a registration table 109. At first, the user name is searched for checking whether or not a table for the user concerned is contained in the registration table 109. After detecting the user table, the user is authenticated by collating the password, thus confirming that the request is given from the user identified.

Next, a check of the latest updated date is to be carried out, however, the latest updated date in the PHS table in the initial status has, as shown in FIG. 5, a maximum value [99991231235959], and it follows that a next process is invariably executed.

As the table set in UUI is blank, the information stored in the registration table 109 is set intact in UUI, and an indication that the information should be transmitted back to the terminal SUB-A, is given. A UUI processing module 104 receiving the indication arranges the information in the registration table 109 in accordance with the UUI format shown in FIGS. 9 through 11, and transfers the information to the communication processing module 101.

The communication processing module 101 transmits UUI padded to an ALEART message in accordance with the sequence shown in FIGS. 7 and 9. In this sequence, no further communications than updating the registered information is performed, and therefore a DSC message is transmitted without issuing a CONN message, with result that the line is disconnected.

Next, the PHS is set so that the information can be received as a UUI mail. As shown in FIG. 4, [Receiving Mode Setting], [Batchwise Setting], [Additional Setting] and [UUI Mail] are selected in this sequence from the menu. There are provided [Detail Setting] for setting, in the terminal SUB-A supporting this service, the medium to be converted for plural items of media information delivered to the receiver and all the receiving terminals SUB-BS, and [Batchwise Setting] for setting so that all pieces of information are received via a certain medium by a certain terminal SUB-B.

When selecting [UUI Mail], a telephone number allocated to the PHS itself that has inputted the setting, is set. If specifying other telephone number, the UUI mail can be transferred to a terminal SUB-B that is not held by the user. Further, messages containing the same content can be received by a plurality of terminals SUB-BS by validating the transmission to a plurality of telephone numbers. Moreover, when replied from the plurality of terminals SUB-BS, the information may be transmitted and received between the plurality of terminals SUB-BS.

For reflecting the information set in the PHS in the information communication processing system 1, as shown in FIG. 4, [Change of Registered Information] is selected from the menu. Just when making the above change based on the flow of operations in FIG. 6, the flag is set to [1], and hence the updated table is set in UUI in accordance with the format in FIGS. 9 through 11. Then, the message is transmitted to the information communication processing system 1 in the sequence shown in FIGS. 7 and 8.

The information communication processing system 1 operates according to the flow of operations shown in FIGS. 13 and 14. The table is set in UUI in any one of the communication processing modules 101 connected to the PHS network in FIG. 18, so that that piece of information is transferred to the UUI processing module 104. The UUI processing module 104 extracts the user name, the password, the latest updated date and the set information, and stores these data elements in the sender information storage module 106.

The registration table management module 108 searches the user table TBL2 from the registration table 109, and checks an integrity of the password and whether the latest updated date is more recent than the date in the registration table 109. If the password is coincident and the latest updated date is more cent than in the registration table 109, it is judged that the registration table 109 is updated, and updating is carried out as shown in FIG. 12.

Thereafter, the receiver has a telephone call (044-777-xxx) from the sender. The information communication processing system 1 existing at a relay point operates based on the flow of operations in FIGS. 13 and 14. The communication is not urgent, and hence the communication processing module 101 in FIG. 18 stores a piece of sender information (the telephone number in this case) and destination information in the sender information storage module 106. The registration table management module 108 searches the user table containing the destination telephone number.

After confirming that there exists the relevant information in FIG. 12, it is checked which medium the telephone is converted into. No setting is done in a specifying processing table, and therefore the information communication processing system 1 conforms with a table of normal processing. It can be understood from the registration made a short while ago from the PHS that the information received via the telephone is converted into a UUI mail and delivered to 070-8888-xxxx. A converted result notifying module 102 generates a means (voices in this case) for notifying of the conversion into the UUI mail and of the destination telephone number, corresponding to the medium used by the sender.

Thereafter, the processing is executed according to a converting operation in FIG. 15. To start with, a media converting module 112 converts the voices uttered from the sender at a certain interval into a text format, and stores the converted text data in a message storage module 107. A unique-to-media format creating module 110 converts the text data into a UUI mail format and transfers the UUI-mail-formatted data to the communication processing module 101.

The communication processing module 101 makes a call and transmits the SETUP message containing the UUI to the receiving terminal in accordance with the sequence in FIGS. 16 and 17. The sender uses the telephone, and therefore the operation is not that the processing does not come to an end by sending the message once as in the case of the E-mail but that the media conversion is required to be sequentially executed till the sender finishes the communications.

Herein, after connecting the line to the receiving terminal SUB-B, the UUI mail is delivered. Even in a case where the receiving terminal performs other communications, however, it is feasible to transmit and receive the UUI frame, and the UUI mail may be delivered without executing the transmission as shown in FIG. 17. If all the information can not completely be sent by one UUI frame transmission, the information is segmented and restored by use of a segmentation identifier and a sequence number shown in the structure diagrams in FIGS. 9 through 11.

The receiving terminal SUB-B operates based on the flow of operations shown in FIG. 6. The receiver receives the UUI mail and makes a reply by inputting this reply. In this case, the UUI mail is delivered back to the information communication processing system 1. The information communication processing system 1 executes an operation of receiving the UUI mail and converting it into a voice format of the telephone, whereby the voices are transmitted to the sender and the mutual communications can be thus performed.

If the PHS registered information is changed before receiving the UUI mail, and if the information communication processing system 1 is not yet requested to update, the flag is set to [1] in FIG. 6. Therefore, the registered information is also updated by the method exemplified at first in this operational example while transferring and receiving the UUI mail.

[Second Operational Example: Case of Receiver Receiving Arrived E-Mail by IP Telephone]

Figure 19:
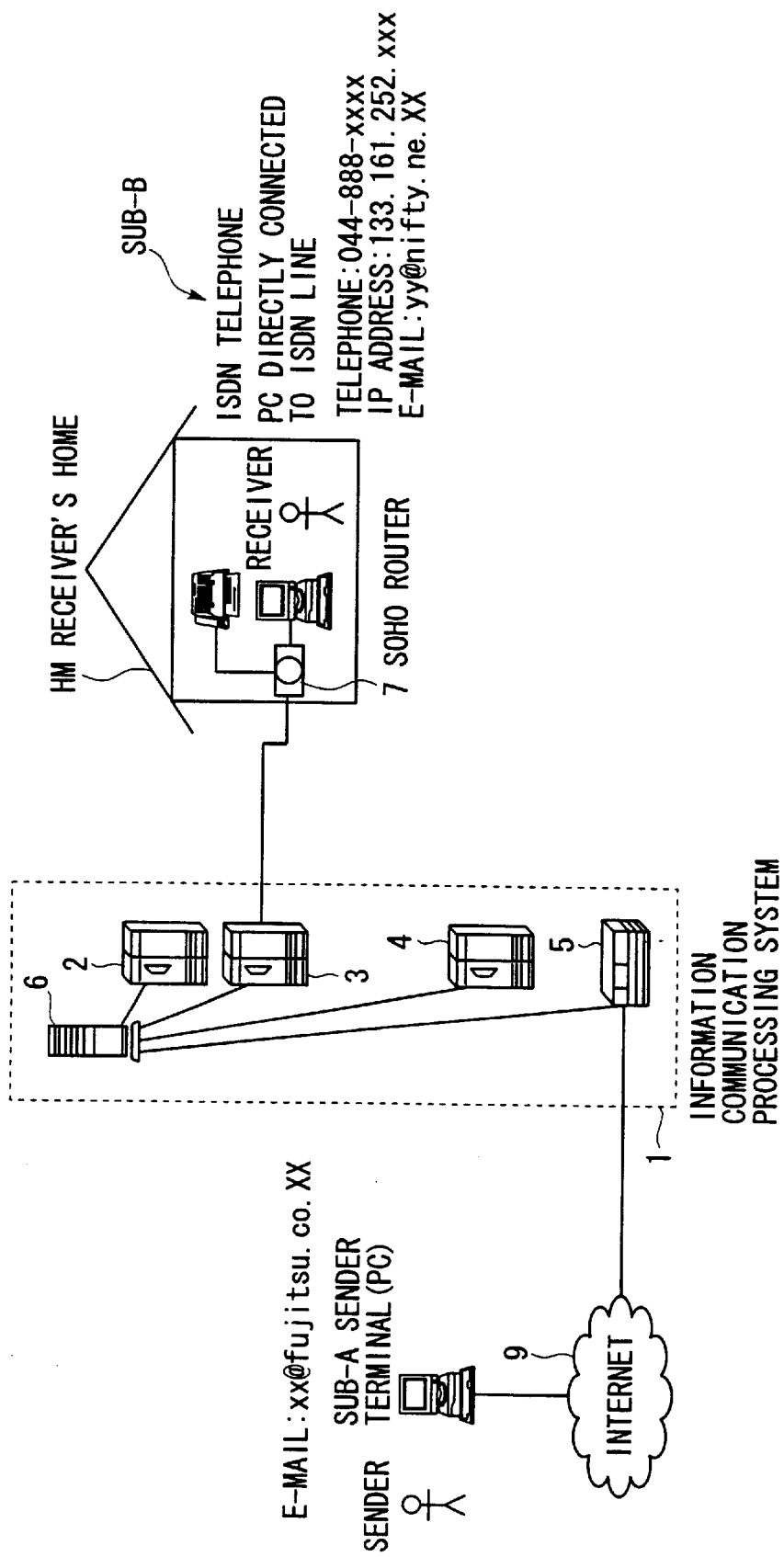
FIG. 19 is a diagram showing a system architecture in a second operational example.
Figure 20:
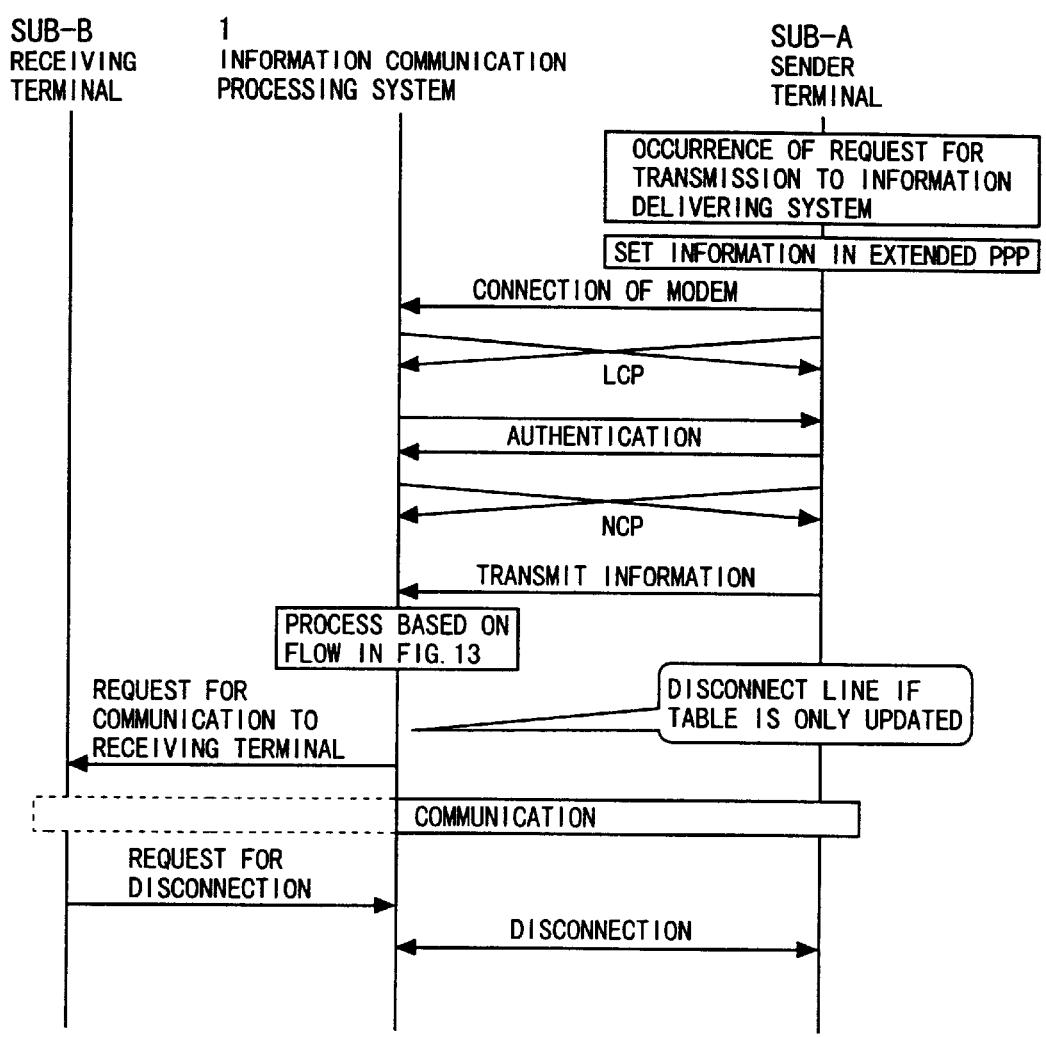
FIG. 20 is a sequence chart (PPP) of transmission to the information communication processing system.
Figure 24:
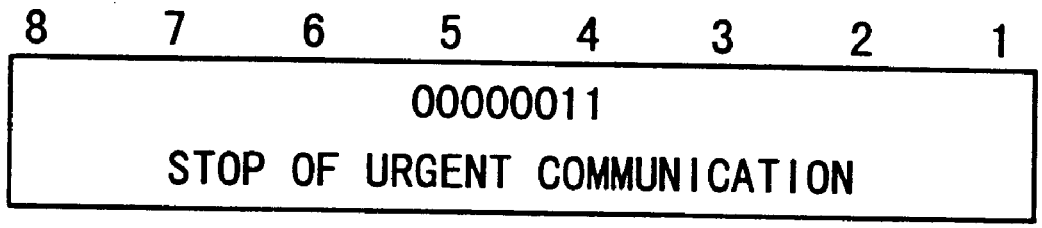
FIG. 24 is a diagram showing a structure of the PPP frame.
Figure 26B:
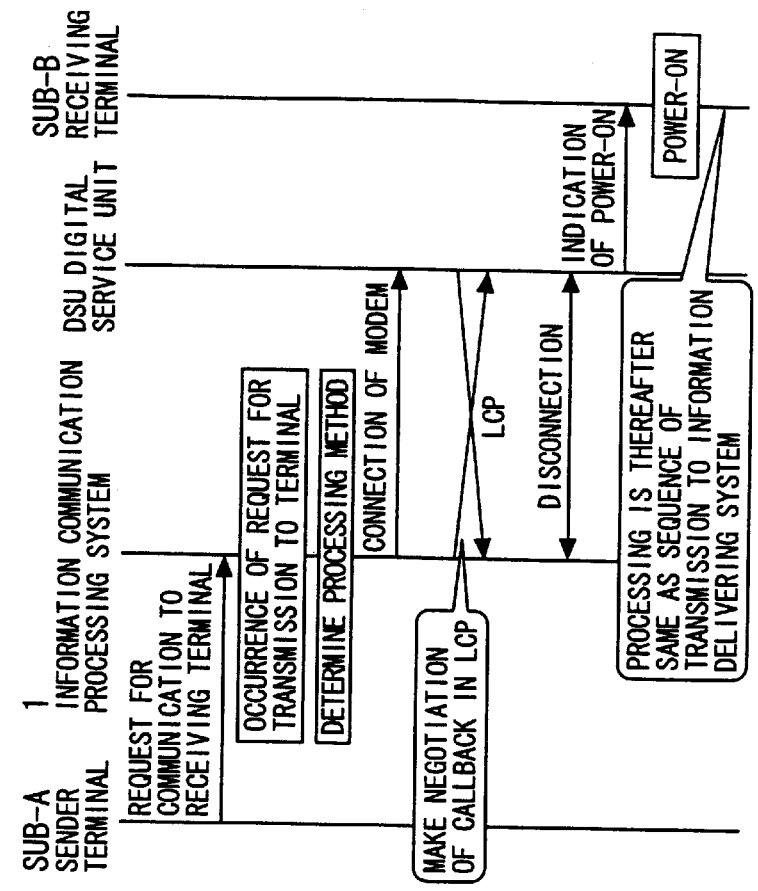
FIG. 26 is a sequence chart (PPP) of transmission to the terminal.
Figure 26A:
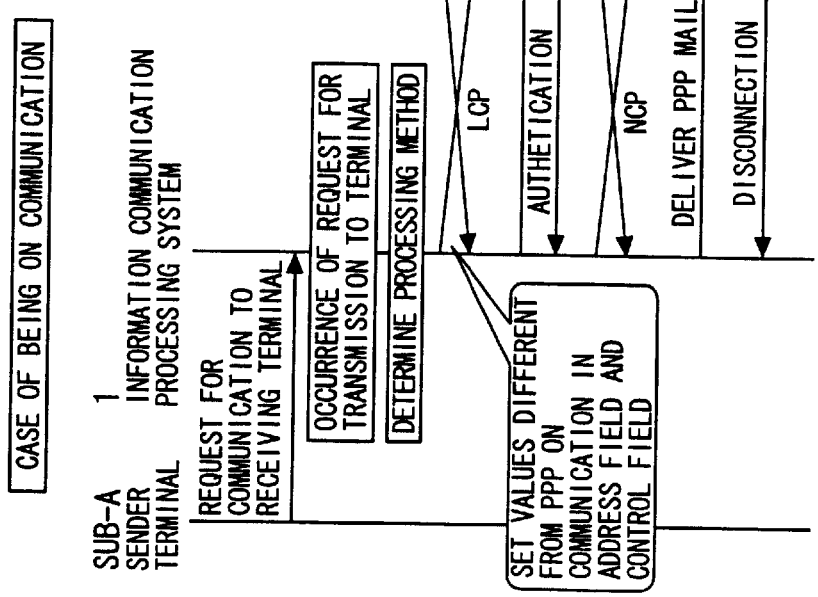

FIG. 19 is a diagram showing a system architecture. FIG. 6 is the diagram showing the flow of operations of the receiving terminal. FIGS. 20 and 21 are diagrams each showing a sequence of transmission to the information communication processing system 1 (in the case of PPP (Point-to-Point Protocol)). FIGS. 22 through 24 are diagrams each showing a PPP frame structure. FIG. 25 is a table TBL2 retained by the information communication processing system 1. FIGS. 13 and 14 are diagrams each showing the flow of operations of the information communication processing system 1. FIG. 15 is a table of a media converting operation of the information communication processing system 1. FIG. 26 is a diagram showing a sequence of transmission to the terminal SUB-B (in the case of PPP). FIG. 18 is a block diagram showing the functions of the information communication processing system 1. A second operational example will be explained with reference to FIGS. 19, 6, 20 through 25, 13 through 15, 26 and 18.

In the media convert type information communication system, as shown in FIG. 19, the PC as a sender terminal SUB-A is connected via the Internet 9 to the information communication processing system 1, and the information communication processing system 1 and the PC as a receiving terminal SUB-B possessed by the receiver are connected by the ISDN oriented switch 3 via the SOHO router 7. At the present, however, a power source of the receiver's PC is not yet switched ON.

The sender tries to deliver an E-mail (address: The receiver tries to register in the information communication processing system 1 so as to receive all the information through an IP telephone (telephone number: 133.161.252.xxx). [Receiving Mode Setting] is selected from a menu of the application about the present service on the PC, and, after setting the above information, [Registered Information Updating] is selected.

Based on the flow of operations, flag is set to [1] just when the above change is effected, and therefore a table updated to extended PPP in accordance with a format in FIGS. 22~24, is set and transmitted to the information communication processing system 1 in a sequence in FIGS. 20 and 21.

A PPP logic line different from PPP normally used is employed based on extended PPP, and hence, even when the receiving terminal SUB-B is in the process of communications, the information communication processing system 1 receiving PPP operates according t the flow of operations in FIGS. 13 and 14.

The communication processing module 101 that deals with a PPP frame on the telephone network in FIG. 18, because of the table being set in extended PPP, transfers that piece of information to a PPP processing module 103. The PPP processing module 103 extracts the user name, the password, the latest updated date and the set information, and stores data elements in the sender information storage module 106. The registration table management module 108 searches the user table from the registration table 109, then checks the password, and confirms that the latest updated date is more recent than in the registration table 109. If the password is coincident and the latest updated date is more recent, it is judged that the registration table 109 is updated, and updating is conducted as shown in FIG. 25.

The receiver receives an E-mail (yy@nifz.ne.xx) from the sender. The information communication processing system 1 existing at the relay point operates based on the flow of operations in FIGS. 13 and 14. The communication is not urgent, and hence a unique-to-media format identifying/deleting module 111 confirms that it is classified as the E-mail, stores a piece of sender information (in this case, the E-mail address: xx@fujitsu.com.xx) and destination information in the sender information storage module 106. The registration table management module 108 searches the user table containing the destination E-mail address. After confirming that the table in FIG. 25 exists, it is checked which medium the E-mail is converted into.

No setting is done about [xx@fujitsu.co.xx] in the specifying processing table, and therefore the information communication processing system 1 conforms with the table of normal processing. If there is an E-mail from [zz@xx.com] existing in the specifying process table, a content of the E-mail is discarded, and no further process is executed. In addition, the message response module 105 may create a reply of being unable to accept the information and send it back to the sender (zz@xx.com), or may transfer the information directly to a national or private grievance center like the Cyber Police.

It can be understood that the information received by the E-mail is converted into an IP telephone format according to the table of the normal processing and sent to [133.161.252.xxx]. The converted result notifying module 102 converts the information into the IP telephone format, then generates an IP address of the destination in accordance with the medium (the E-mail in this case) used by the sender, and transmits this IP address.

Thereafter, the processing is executed based on the converting process in FIG. 15. To start with, though trying to establish a connection to [133.161.252.xxx], it falls into a failure because of the PC power source being kept OFF. Then, a telephone number corresponding to the IP address set in the registration table 109 is searched, and the communication processing module 101 calls the receiving terminal SUB-B in accordance with the sequence in FIG. 26.

The SOHO router 7, which accepts a start of a PPP negotiation, because of the PC power source being kept OFF, transmits Configure-Reject as a response to the normal connection request, and gets the negotiation into a failure. The information communication processing system 1 receiving once Configure-Reject judges that a power source of the terminal SUB-B is not switched ON, and calls the receiving terminal once again. The information communication processing system 1 requests a callback this time with an implication of indicating the terminal to switch ON its terminal power source in Configure-Request.

Based on PPP callback specifications, after an end of the negotiation, the line is once disconnected. The SOHO router 7 judges that the callback implies an indication of switching ON the power source, and turns ON a switch of a plug socket of the power source connected to the PC of the SOHO router 7, thus switching ON the power source of the PC connected thereto. Herein, the PPP callback is judged to be the indication of switching ON the power source because of the indication given to the PPP-based terminal SUB-B. In the case of using UUI, however, as shown by the formats in FIGS. 9 through 11, an indication is given by use of UUI, or, in the case of using PPP/UUI, just when the information communication processing system 1 receives a call set as a sender number, this number is previously registered in the SOHO router 7 etc, and it may be judged that this is an indication of switching ON the power source.

The SOHO router 7 makes a dialup connection to the information communication processing system 1 in accordance with the PPP callback specifications. After a fixed period of time has elapsed, the information communication processing system 1 attempts again the connection to [133.161.252.xxx] by the IP telephone application, and then establishes the connection.

The unique-to-media format identifying/deleting module 111 of the information communication processing system 1 extracts the text data from the E-mail and stores the same data in the message storage module 107. The media converting module 112 reads out and converts the text data into voice data. The communication processing module 101 assembles an IP packet of the voice data and forwards the IP packet to the terminal SUB-B. It follows that the receiver listens to the voices through the IP telephone application on the PC.

If the registered information of the terminal has been changed before receiving the information on the IP telephone, and if the information communication processing system 1 is not yet requested to update, the flag is set to [1] in FIG. 6. Therefore, the registered information is also updated by the method exemplified at first in this operational example while transferring and receiving the information on the IP telephones.

[Third Operational Example: Case of Urgent Call Received from Sender]

Figure 27:
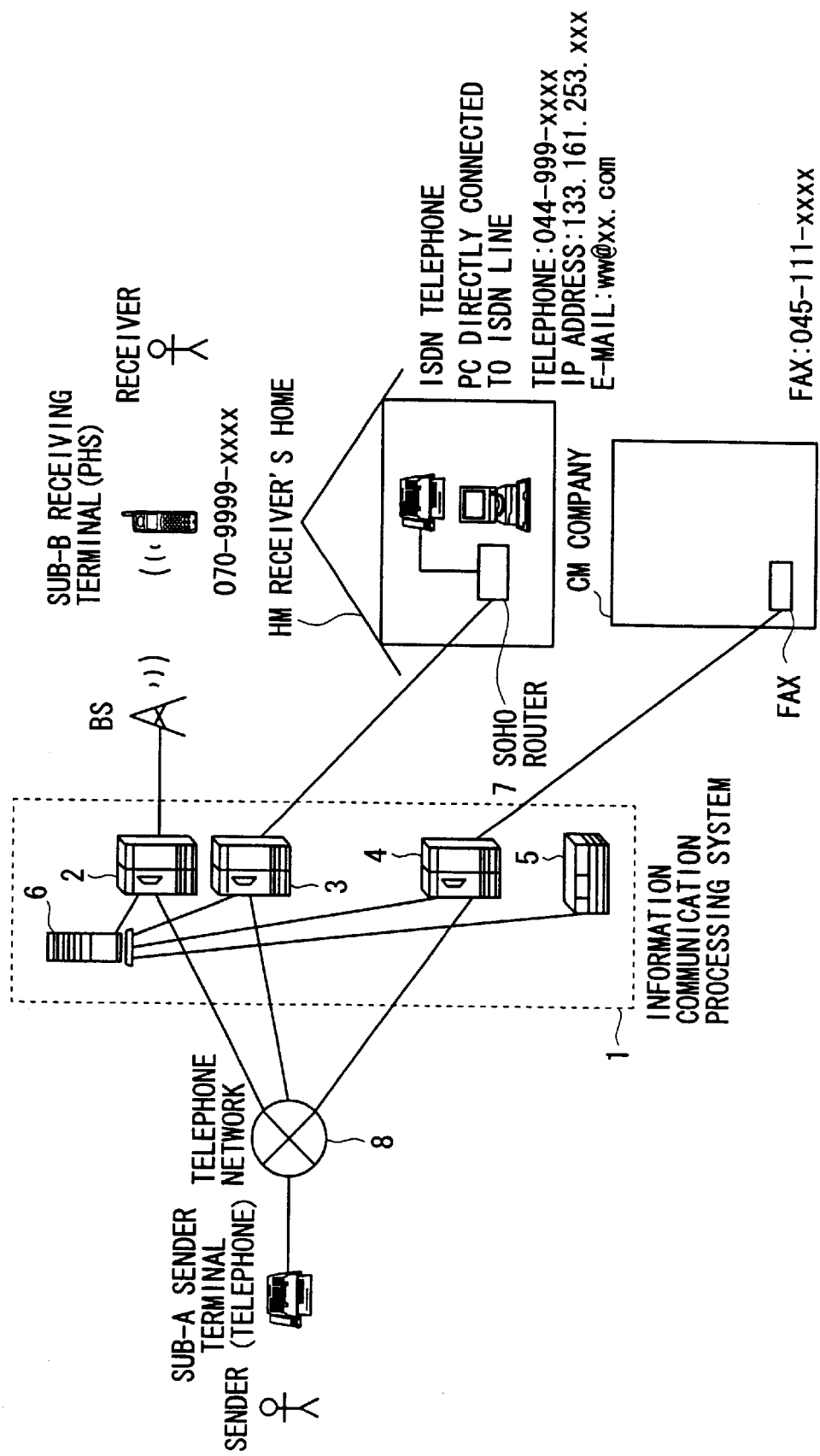
FIG. 27 is a diagram showing a system architecture in a third operational example.

FIG. 27 is a diagram showing a system architecture. FIG. 6 is the diagram showing the flow of operations of the receiving terminal. FIGS. 9 to 11 are the diagrams each showing a UUI frame structure. FIGS. 22 through 24 are the diagrams each showing the PPP frame structure. FIG. 28 is a table TBL2 retained by the information communication processing system 1. FIGS. 13 and 14 are the diagrams each showing the flow of operations of the information communication processing system 1. FIG. 15 is the table of the media converting operation of the information communication processing system 1. FIGS. 16 and 17 are the diagrams each showing the sequence of transmission to the terminal (ISDN/mobile). FIG. 26 is the diagram showing the sequence of transmission to the terminal (in the case of PPP) FIG. 18 is the block diagram showing the functions of the information communication processing system 1. A third operational example will be explained with reference to FIGS. 27, 6, 9 through 11, 20 through 24, 28, 13 through 17, 26 and 18.

In the media convert type information communication system, as shown in FIG. 27, the terminal SUB-A of the sender is connectable via the telephone network 8 to the information communication processing system 1, and the information communication processing system 1 is connectable to the PHS as a receiving terminal SUB-B via the PHS network 2, BS. The information communication processing system 1 and the PC in a receiver's home are connected by the ISDN oriented switch 3 via the SOHO router 7. The information communication processing system 1 and FAX in a company CM to which the receiver belongs are connected by the switch 4 for the telephone.

The sender tries to give an urgent call (telephone number: 044-999-xxxx) to the receiver. The receiver registers, as shown in FIG. 28 receiving conditions so as to receive all the media by UUI mails. When given a telephone call from the sender, the information communication processing system 1 existing at the relay point operates based on the flow of operations shown in FIGS. 13 and 14.

There are a variety of methods of notifying that the communications are urgent on the side of the sender. Herein, however, it shall be distinguished that any one of the communication processing modules 101 connected to the telephone network in FIG. 18 is urgent by transmitting a PB signal [9999] to the information communication processing system 1 having received a telephone call [044-999-xxxx] in a pseudo manner.

In the information communication processing system 1 that has distinguished that it is urgent, the registration table management module 108 searches a user table having a destination telephone number. Herein, if the sender corresponds to the specifying process table, the operation conforms with this process. In this example, a table TBL2 in which the specifying process as FIG. 28 is not set, is confirmed, and thereafter pieces of information are transmitted in sequence to the terminals registered in the table TBL2.

At first, the information is transmitted by a telephone of a medium given in the first line in the table TBL2. The information communication processing system 1 receives a telephone call [044-999-xxxx] in the pseudo manner, and therefore the information communication processing system 1 again dials [044-999-xxxx]. If connectable, the information communication processing system 1 makes a connection to the call received in the pseudo manner and performs the communications. if connected, the urgent communication process stops.

Herein, that telephone is not connected, so that the transmission is tried by the IP telephone of a medium given in the next line in the table TBL2. The procedures are the same as those in the second operational example. The power source of the PC is switched ON with the PPP callback, and the IP telephone application is booted. However, no response is made, and the indication of stopping the urgent communications is not sent back. Next, the E-mail is delivered. The E-mail is, however, merely stacked in the server 6, and the receiver is unable to see this mail.

Next, the UUI mail is delivered to the PHS. The procedures are the same as those in the first operational example. Based on the converting operation in FIG. 15, the media converting module 112 converts the medium into a UUI mail format and thereafter delivers the UUI mail to the terminal SUB-B in the sequence in FIGS. 16 and 17.

The receiver is able to receive the information and immediately sends the urgent communication stop indication in FIGS. 9~11 back to the information communication processing system 1. Then, the urgent communications are stopped, and the communications with the sender take place. When receiving the information not by the PHS but by the PC in the receiver's home HM, the urgent communication stop indication is transmitted based on the PPP frame format in FIGS. 22 through 24.

If the power source of the PHS is not switched ON, it follows that the transmission is carried out by FAX of a media given in the last line in the table. In accordance with the converting operation in FIG. 15, the response module notifies the sender of an input of the voice message, and the voices are recorded in the message storage module 107. The media converting module 112 converts the voices into a text format. The unique-to-media format creating module 110 converts the text data into FAX-formatted data and transfers the FAX data to the communication processing module 101.

The communication processing module 101 sends that piece of information to [045-111-xxxx]. The information communication processing system 1 may returns to the medium given in the first line in the table TBL2 and may also repeat the transmission till the urgent communication stop indication is transmitted from the receiver even after the FAX transmission.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A media convert service providing method comprising:
   a step of utilizing a free usable field or a blank field in a frame based on a specified communication protocol; and
   a step of enabling information for specifying a receiving media convert category and a receiving terminal category to be registered in an information communication processing system on a communication network.

2. A media convert service providing method comprising:
   a step of utilizing a free usable transmission field of signaling information in a UUI frame based on a specified communication protocol; and
   a step of enabling information for specifying a receiving media convert category and a receiving terminal category to be registered in an information communication processing system on a communication network.

3. A media convert service providing method comprising:
   a step of utilizing extended PPP in which a value of a control field in a PPP frame based on a specified communication protocol is a variable code value; and
   a step of enabling information for specifying a receiving media convert category and a receiving terminal category to be registered in an information communication processing system on a communication network.

4. A media convert service providing method according to claim 1, 2 or 3, further comprising a step of notifying a sender of information according to the receiving terminal category and the category of the medium converted based on the registered specified information of a receiver.

5. A media convert service providing method according to claim 1, 2 or 3, further comprising:
   a step of ignoring the registered specified information of the receiver when urgent communication information is transmitted to the receiver; and
   a step of transmitting the communication information to the receiver by use of all possible media and receiving terminals.

6. A media convert service providing method according to claim 5, further comprising:
   a step of repeatedly transmitting the communication information to a registered destination of the receiver when said information communication processing system receives the urgent communication information; and
   a step of stopping the transmission of the communication information when receiving an urgent communication stop indication based on the communication protocol from the receiver.

7. A media convert service providing method according to claim 1, 2 or 3, further comprising:
   a step of registering sender's information of which a receipt is not desired by the receiver in said information communication processing system; and
   a step of executing a specifying process when receiving the communication information from a relevant sender.

8. A media convert service providing method according to claim 7, wherein said specifying process involves replying a reject of receipt to the sender or discarding the communication information itself.

9. A media convert service providing method according to claim 7, further comprising a step of transferring the communication information from the sender to other receiving terminal via a selected medium.

10. A media convert service providing method according to claim 1, 2 or 3, further comprising:
    a step of validating the transmissions to a plurality of receiving terminals; and
    a step of transmitting the communication information to a plurality of terminals possessed by one user or to the terminals possessed by a plurality of users.

11. A media convert service providing method according to claim 1, 2 or 3, further comprising a step of transmitting a copy of a registration table of the specified information to a terminal that does not set a service.

12. A media convert service providing method according to claim 1, 2 or 3, further comprising:
    a step of specifying one medium and one terminal when setting in said receiving terminal the specified information registered according to the receiving media convert categories and the receiving terminal categories;

a step of thereby converting, into one medium, all media receivable by a group of said receiving terminals via said information communication processing system; and a step of receiving the information by one receiving terminal.

13. A media convert service providing method according to claim 1, 2 or 3, wherein all said receiving terminals corresponding to a certain user and said information communication processing system retain the same registration table of the specified information.

14. A media convert service providing method according to claim 1, 2 or 3, further comprising:

a step of transmitting, if a power source of said receiving terminal is not switched ON, an indication of switching ON the power source from said information communication processing system;

a step of switching ON the power source of said receiving terminal by a network terminating device connected to said receiving terminal receiving this indication and thus setting said receiving terminal in a communicable state; and a step of thereafter transmitting the communication information by said information communication processing system.

15. A media convert service providing method according to claim 14, further comprising a step of giving the indication of switching ON the power source to said receiving terminal from said information communication processing system by use of a sender's telephone number.

* * * * *